United States Patent
Hayata

(10) Patent No.: US 9,290,015 B2
(45) Date of Patent: Mar. 22, 2016

(54) INKJET RECORDING METHOD AND PRINTED MATERIAL

(71) Applicant: FUJIFILM CORPORATION, Tokyo (JP)

(72) Inventor: Yuuichi Hayata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 141 days.

(21) Appl. No.: 13/972,710

(22) Filed: Aug. 21, 2013

(65) Prior Publication Data

US 2014/0055539 A1    Feb. 27, 2014

(30) Foreign Application Priority Data

Aug. 24, 2012 (JP) .................. 2012-185396

(51) Int. Cl.
*B41J 2/01* (2006.01)
*B41J 11/00* (2006.01)
(Continued)

(52) U.S. Cl.
CPC .............. *B41J 11/002* (2013.01); *B41J 2/2107* (2013.01); *B41M 5/0023* (2013.01);
(Continued)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218

USPC ................. 347/100, 95, 102, 101, 96, 21, 20; 106/31.6, 31.13, 31.27; 523/160, 161
See application file for complete search history.

(56) References Cited

U.S. PATENT DOCUMENTS 4,425,403 A * 1/1984 Taniguchi et al. ............ 428/331
7,500,745 B2 * 3/2009 Ushirogouchi et al. ...... 347/102
(Continued)

FOREIGN PATENT DOCUMENTS

EP    2345703 A1    7/2011
EP    2484526 A1    8/2012
(Continued)

OTHER PUBLICATIONS

The extended European search report issued on Dec. 17, 2013, which corresponds to European Patent Application No. 13181157.2-1704 and is related to U.S. Appl. No. 13/972,710.
(Continued)

*Primary Examiner* — Manish S Shah
(74) *Attorney, Agent, or Firm* — Studebaker & Brackett PC

(57) ABSTRACT

The object of the present invention is to provide an ink jet recording method where it is possible to obtain a printed material where the elution amount (migration) to the outside of the components in a cured ink composition is small and there is little character blurring, and a printed material. The ink jet recording method of the present invention includes a step of ejecting an ink composition which contains 3-methyl pentanediol diacrylate of 30 mass % or more with respect to the total ink composition from an ink jet head onto a support, and a step of irradiating active rays in an atmosphere where the oxygen partial pressure is 0.10 atm or less to cure the ink composition.

17 Claims, 1 Drawing Sheet

(51) Int. Cl.
*B41J 2/21* (2006.01)
*B41M 5/00* (2006.01)
*B41M 7/00* (2006.01)
*C09D 11/101* (2014.01)
*C09D 11/30* (2014.01)

(52) U.S. Cl.
CPC .......... *B41M 5/0047* (2013.01); *B41M 7/0081* (2013.01); *C09D 11/101* (2013.01); *C09D 11/30* (2013.01); *B41M 5/0064* (2013.01)

(56) References Cited

U.S. PATENT DOCUMENTS

| | | | |
|---|---|---|---|
| 2008/0286484 A1* | 11/2008 | Tojo et al. | 427/511 |
| 2009/0087626 A1* | 4/2009 | Hayata et al. | 428/195.1 |
| 2011/0169902 A1* | 7/2011 | Hayata et al. | 347/102 |
| 2011/0169903 A1* | 7/2011 | Hayata et al. | 347/102 |
| 2012/0026235 A1 | 2/2012 | Hayata | |
| 2014/0242353 A1* | 8/2014 | Nakano et al. | 347/20 |

FOREIGN PATENT DOCUMENTS

| | | |
|---|---|---|
| JP | 2008-068516 A | 3/2008 |
| JP | 2008-105253 A | 5/2008 |
| JP | 2011-144250 A | 7/2011 |
| JP | 2011-144251 A | 7/2011 |
| JP | 2013-209518 A | 10/2013 |
| JP | 2013-227448 A | 11/2013 |
| WO | 2009/053305 A1 | 4/2009 |
| WO | 2012/110815 A1 | 8/2012 |

OTHER PUBLICATIONS

An Office Action; "Notice of Reasons for Rejection," issued by the Japanese Patent Office on Jun. 10, 2014, which corresponds to Japanese Patent Application No. 2012-185396 and is related to U.S. Appl. No. 13/972,710; with English language translation.

* cited by examiner

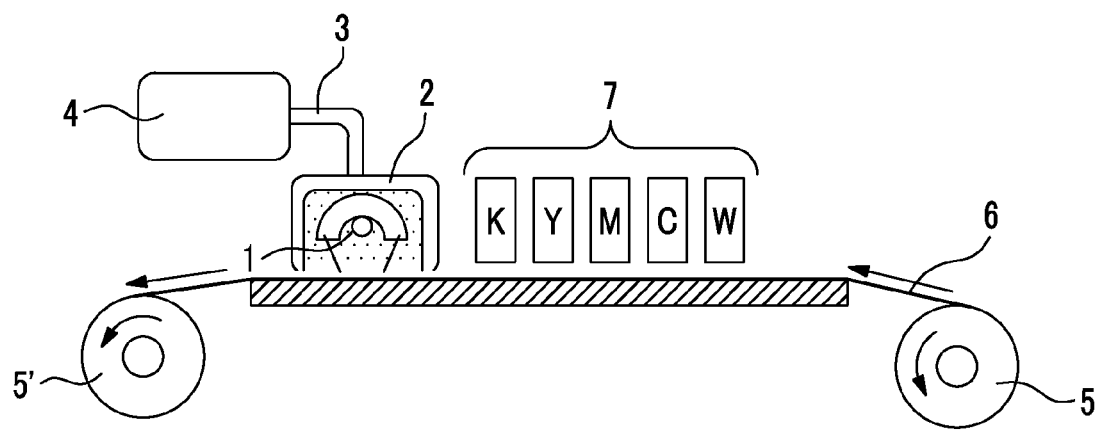

INKJET RECORDING METHOD AND PRINTED MATERIAL

BACKGROUND OF THE INVENTION

1. Field of the Invention

The present invention relates to an ink jet recording method and a printed material.

2. Description of the Related Art

As image recording methods where an image is formed on a recording medium such as paper based on an image signal, there are electrophotographic systems, sublimation type and fusion type thermal transfer systems, and ink jet systems.

It is possible for ink jet systems to efficiently use the ink composition and the running costs are low, particularly in cases of small lot production, since the printing apparatuses are not expensive and the ink composition is ejected onto only the necessary image portion to directly form an image on the recording medium and a plate is not necessary during the printing. Furthermore, ink jet systems make little noise and are excellent as image recording systems, thereby attracting much attention in recent years.

Among these, a system using an ink composition for ink jet recording which is curable by irradiation with radiation such as ultraviolet rays (a radiation-curable type ink jet recording ink composition) is an excellent system from the points of view that the drying property is excellent in comparison with solvent-based ink compositions since the majority of the components of the ink composition are cured by the irradiation with radiation such as ultraviolet rays and that it is possible to print onto various types of recording media since the images do not run easily.

Examples of the ink composition for ink jet recording in the related art are shown in WO2009/053305A and US2012/0026235A.

SUMMARY OF THE INVENTION

An object of the present invention is to provide an ink jet recording method where it is possible to obtain a printed material where the elution amount (migration) to the outside of the components in a cured ink composition is small and there is little character blurring, and a printed material.

The above-described object of the present invention has been solved by the means according to the following <1> and <16>. <2> to <15>, which are preferable embodiments, are also described below.

<1> An ink jet recording method including a step of ejecting an ink composition which contains 3-methyl pentanediol diacrylate of 30 mass % or more with respect to the total ink composition from an ink jet head onto a support, and (step II) a step of irradiating active rays in an atmosphere where the oxygen partial pressure is 0.10 atm or less to cure the ink composition.

<2> The ink jet recording method according to the above-described <1> where the ink composition contains 3-methyl pentanediol diacrylate of 40 mass % or more with respect to the total ink composition.

<3> The ink jet recording method according to the above-described <1> or <2> where the ink composition contains 3-methyl pentanediol diacrylate of 50 mass % or more with respect to the total ink composition.

<4> The ink jet recording method according to any one of the above-described <1> to <3> where the ink composition contains a multifunctional acrylate compound with a molecular weight of 315 or more of 5 to 40 mass % with respect to the total ink composition.

<5> The ink jet recording method according to any one of the above-described <1> to <4> where the ink composition contains a bisacylphosphine compound.

<6> The ink jet recording method according to any one of the above-described <1> to <5> where the ink composition substantially does not contain a polymerization initiator with a molecular weight of 354 or less.

<7> The ink jet recording method according to any one of the above-described <1> to <6> where the ink composition contains a compound represented by the following Formula (1) or Formula (2).

[Chem. 1]

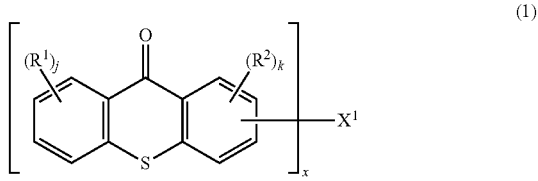

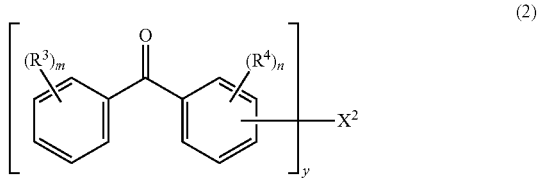

(In Formula (1) and Formula (2), $R^1$, $R^2$, $R^3$, and $R^4$ each independently represent an alkyl group which has a carbon number of 1 to 5 or a halogen atom, x and y each independently represent an integer of 2 to 4, m and j each independently represent an integer of 0 to 4, k and n each independently represent an integer of 0 to 3, when j, k, m, and n are integers of 2 or more, $R^1$, $R^2$, $R^3$, and $R^4$, which are present as a plurality, may respectively be the same or different, $X^1$ may include an ether bond and/or an ester bond, and represent a hydrocarbon chain with x valence which has a carbon number of 2 to 300, $X^2$ represent a hydrocarbon chain with y valence which has a carbon number of 2 to 300 which may include an ether bond and/or an ester bond.)

<8> The ink jet recording method according to any one of the above-described <1> to <7> where a viscosity of the ink composition at 25° C. is 8 to 13 mPa·s.

<9> The ink jet recording method according to any one of the above-described <1> to <8> where the ink composition contains 3-methyl pentanediol diacrylate of 95 mass % or less with respect to the total ink composition.

<10> The ink jet recording method according to any one of the above-described <1> to <9> where the ejecting of the ink composition is performed by a single pass system.

<11> The ink jet recording method according to the above-described <10> where a transport speed of the support is 50 m/min or more.

<12> The ink jet recording method according to any one of the above-described <1> to <11> where the support includes a material which is selected from a group consisting of polypropylene, polyethylene, polyethylene terephthalate, and nylon, and is a support with a film thickness of 10 to 90 μm.

<13> The ink jet recording method according to any one of the above-described <1> to <12> where the active rays are irradiated in an atmosphere where the oxygen partial pressure is 0.02 atm or less.

<14> The ink jet recording method according to any one of the above-described <1> to <13> where a content of a monofunctional polymerizable compound is 5 mass % or less with respect to the total ink composition.

<15> The ink jet recording method according to any one of the above-described <1> to <14> where the ink jet recording method is used for package printing.

<16> A printed material which is obtained by the ink jet recording method according to any one of the above-described <1> to <15>.

According to the present invention, it is possible to provide an ink jet recording method where it is possible to obtain a printed material where the elution amount (migration) to the outside of the components in a cured ink composition is small and there is little character blurring, and a printed material.

BRIEF DESCRIPTION OF THE DRAWING

FIG. 1 is a schematic diagram which shows an example of an ink jet recording apparatus which is suitably used in the present invention.

DESCRIPTION OF THE PREFERRED EMBODIMENTS

Below, detailed description will be given of the present invention.

The ink jet recording method of the present invention includes (step I) a step of ejecting an ink composition (referred to below as the ink composition of the present invention or simply as the ink) which contains (component A) 3-methyl pentanediol diacrylate as 30 mass % or more of the total ink composition from an ink jet head onto a support, and (step II) a step of irradiating active rays in an atmosphere where the oxygen partial pressure is 0.10 atm or less to cure the ink composition.

Here, in the specification, description of "A to B" which represents a numerical range has the same meaning as "A or more and B or less". In addition, the "(component A) 3-methyl pentanediol diacrylate" or the like may be referred to simply as "component A" or the like, and "(step I) a step of ejecting an ink composition which contains (component A) 3-methyl pentanediol diacrylate as 30 mass % or more of the total ink composition from an ink jet head onto a support" or the like may be referred to simply as "step I" or the like. In addition, "mass %" and "parts by mass" have the same meanings as "weight %" and "parts by weight" respectively.

Furthermore, in the present invention, the description respectively includes "meth(acrylate)" in cases where both or either of "acrylate" and "methacrylate" are indicated, and "meth(acryl)" in cases where both or either of "acryl" and "methacryl" are indicated.

For the printed material which is obtained by the active ray curing type ink jet recording method of the related art, there have been problems in that unreacted monomers, a polymerization initiator, a polymerization initiator residue, and the like are moved from the cured film, in particular, there have been problems in that the amounts which are transferred to the packaged objects, the so-called migration (elution, transference) amounts are great in cases of use in package printing such as for food wrapping.

In addition, there is a demand for character clarity which is suitable for the high productivity which is demanded in package printing.

It is possible for the present invention to provide an ink jet recording method where it is possible to obtain a printed material where the elution amount (migration) to the outside of the components in a film is small and there is little character blurring by adopting the above-described configuration.

The details of the mechanism are not known; however, it is estimated that it is possible to obtain a printed material where a cross-linked structure is formed in the cured film, migration is suppressed, and there is little character blurring by adopting an ink composition for ink jet recording which contains a specific amount of component A and performing the irradiation of the active rays with respect to the ink composition which was ejected onto the support under a low oxygen partial pressure.

Below, detailed description will be given of the ink composition of the present invention.

(Ink Composition)

The ink composition of the present invention contains (component A) 3-methyl pentanediol diacrylate as 30 mass % or more of the total ink composition.

The ink composition of the present invention is an oily ink composition which is curable by active rays. The "active rays" are radiation rays capable of providing energy causing the generation of an initiating species in the ink composition by irradiation, and broadly include α rays, γ rays, X-rays, ultraviolet rays, visible light, and electron beams. Among these, ultraviolet rays and electron beams are preferable from the point of view of curing sensitivity and the availability of equipment, and ultraviolet rays are more preferable.

In addition, the ink composition of the present invention is preferably a radically polymerizable ink composition.

(Component A) 3-Methyl Pentanediol Diacrylate

The ink composition of the present invention contains (component A) 3-methyl pentanediol diacrylate. As a result of containing the 3-methyl pentanediol diacrylate, the printed material has little odor and low migration, and additionally, it is possible to obtain an ink composition which is excellent in continuous ejection stability using the ink jet system.

As the 3-methyl pentanediol diacrylate, 3-methyl-1,5-pentanediol diacrylate is preferable.

The ink composition of the present invention contains 3-methyl pentanediol diacrylate as 30 mass % or more of the total ink composition, preferably 40 to 95 mass %, more preferably 50 to 95 mass %, even more preferably 55 to 90 mass %, and particularly preferably 65 to 78 mass %. Within the above-described ranges, it is possible to obtain a printed material where migration is suppressed, there is little odor, and which is excellent in blocking resistance, in addition, the curability is excellent.

(Component B) Multifunctional Acrylate Compound with Molecular Weight of 315 or More The ink composition of the present invention preferably contains a multifunctional acrylate compound (component B) with a molecular weight of 315 or more. As a result of containing the multifunctional acrylate with a molecular weight of 315 or more, it is possible to obtain a printed material where there is little odor and low migration and which has excellent flexibility.

As component B, a bifunctional acrylate and/or a trifunctional acrylate compound are preferable.

In addition, the molecular weight of component B is preferably 315 to 2,000, more preferably 315 to 1,000, and even more preferably 315 to 500.

Specifically, examples of component B include polyethylene glycol diacrylate, polypropylene glycol diacrylate, ethylene oxide (EO)-modified bisphenol A diacrylate, propylene oxide (PO)-modified neopentyl glycol diacrylate, EO-modified hexanediol diacrylate, PO-modified hexanediol diacrylate, EO-modified cyclohexanediol diacrylate, PO-modified cyclohexanediol diacrylate, EO-modified trimethylolpropane triacrylate, PO-modified trimethylolpropane triacrylate, pentaerythritol tetra acrylate, ditrimethylolpropane tetra acrylate, EO-modified pentaerythritol tetra acrylate, dipentaerythritol penta acrylate, and the like.

From the point of view of achieving both curability and flexibility of the cured film, a multifunctional acrylate compound which has an ethylene oxide group and/or a propylene oxide group is preferable as the component B and a multifunctional acrylate compound which has an ethylene oxide group is particularly preferable.

In addition, the total number of moles of the ethylene oxide group and propylene oxide group per molecule which belongs to component B is preferably 2 to 20, more preferably 2 to 10, even more preferably 2 to 8, and particularly preferably 4 to 8.

In addition, as the component B, a multifunctional acrylate compound where an ethylene oxide and/or a propylene oxide modified polyvalent alcohol is acrylated is preferable, and a multifunctional acrylate compound where an ethylene oxide modified polyvalent alcohol is acrylated is particularly preferable.

In addition, in a case where the component B is a multifunctional acrylate compound where an ethylene oxide and/or a propylene oxide modified polyvalent alcohol is acrylated, the total added number of moles of the EO and/or PO in the polyvalent alcohol is preferably 2 to 20, more preferably 2 to 10, even more preferably 2 to 8, and particularly preferably 4 to 8.

Among these, as the component B, a compound which is selected from a group consisting of EO-modified hexanediol diacrylate, PO-modified hexanediol diacrylate, EO-modified cyclohexanediol diacrylate, PO-modified cyclohexanediol diacrylate, EO-modified trimethylolpropane triacrylate, and PO-modified trimethylolpropane triacrylate is preferable, a compound which is selected from a group consisting of EO-modified hexanediol diacrylate, EO-modified cyclohexanediol diacrylate, and EO-modified trimethylolpropane triacrylate is more preferable, and EO-modified trimethylolpropane triacrylate is particularly preferable.

In addition, as component B, a compound which is represented by the following Formula (B1) or Formula (B2) is preferable.

[Chem. 2]

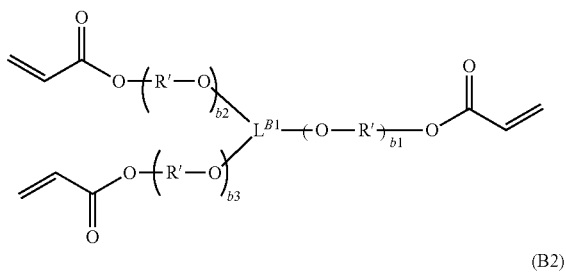

(B1)

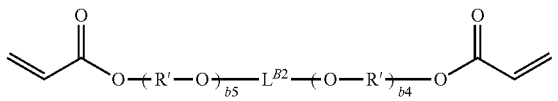

(B2)

(In the Formula (B1) and the Formula (B2), $L^{B1}$ represents a trivalent hydrocarbon group, $L^{B2}$ represents a divalent hydrocarbon group, R' each independently represent —$CH_2CH_2$—, —$CH(CH_3)CH_2$—, or —$CH_2CH(CH_3)$—, b1 to b5 each independently represent an integer of 0 to 6.)

The $L^{B1}$ represents a trivalent hydrocarbon group, preferably a trivalent hydrocarbon group which has a carbon number of 4 to 12, more preferably a trivalent hydrocarbon group which has a carbon number of 4 to 8, even more preferably a trivalent hydrocarbon group which has a carbon number of 5 to 7, and particularly preferably a trivalent hydrocarbon group which has a carbon number of 6.

The $L^{B2}$ represents a divalent hydrocarbon group, preferably a divalent hydrocarbon group which has a carbon number of 4 to 12, more preferably a divalent hydrocarbon group which has a carbon number of 4 to 8, even more preferably a divalent hydrocarbon group which has a carbon number of 5 to 7, and particularly preferably a divalent hydrocarbon group which has a carbon number of 6.

R' represents —$CH_2CH_2$—, —$CH(CH_3)CH_2$—, or —$CH_2CH(CH_3)$—, particularly preferably —$CH_2CH_2$—.

b1 to b5 each independently represent an integer of 0 to 6, preferably an integer of 0 to 4, more preferably an integer of 0 to 3, and even more preferably an integer of 1 to 3.

The ink composition of the present invention may contain one type of the component B alone, or may contain two or more types.

The ink composition of the present invention preferably contains the component B as 1 to 40 mass % of the total ink composition, more preferably contains 5 to 40 mass %, even more preferably 5 to 20 mass %, and particularly preferably 7 to 20 mass %. Within the above-described ranges, it is possible to obtain a printed material where migration is suppressed and there is little odor.

(Component C) Polymerization Initiator

The ink composition of the present invention preferably contains a (component C) polymerization initiator, and more preferably contains a radical polymerization initiator.

In addition, the ink composition of the present invention preferably substantially does not contain a polymerization initiator with a molecular weight of 354 or less. With the above-described aspect, it is possible to obtain a printed material where the migration is further suppressed and there is little odor. Here, in the present invention, "substantially does not contain" means that the content is 1.0 mass % or less with respect to the whole composition.

In the ink composition of the present invention, the content of the polymerization initiator with a molecular weight of 354 or less is more preferably 0.5 mass % or less with respect to the total mass of the ink composition, even more preferably 0.1 mass % or less, and it is particularly preferable that the polymerization initiator with a molecular weight of 354 or less not be contained. Within the above-described ranges, it is possible to obtain a printed material where migration is further suppressed and there is little odor.

The polymerization initiator in the present invention not only includes a compound which absorbs external energy such as active rays to generate a polymerization initiating species, but also a compound (in other words, a sensitizer) which absorbs specific active rays to promote decomposition of the polymerization initiator. In addition, a compound (in other words, a co-initiator) which has a function which increases the radical generation efficiency of the polymerization initiator.

<Bisacylphosphine Compound>

The ink composition of the present invention preferably contains a bisacylphosphine oxide as a polymerization initiator. With the above-described aspect, it is possible to obtain a printed material where the migration is further suppressed and there is little odor.

The bisacylphosphine oxide compound is not particularly limited and it is possible to use known compounds; however, among the compounds which are represented by the following Formula (b-1), compounds with a molecular weight of 354 or more (more preferably compounds with a molecular weight which exceeds 354) are preferable.

The bisacylphosphine oxide compound may be used as one type alone, or may be used in a combination of two or more types.

[Chem. 3]

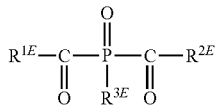

(b-1)

(In Formula (b-1), $R^{1E}$, $R^{2E}$, and $R^{3E}$ each independently represent halogen atoms, and aromatic hydrocarbon groups which may have a methyl group or an ethyl group as a substituent.)

Examples of the bisacylphosphine oxide compounds include the bisacylphosphine oxide compounds disclosed in JP1991-101686 (JP-H03-101686), JP1993-345790 (JP-H05-345790), and JP1994-298818 (JP-H06-298818).

Specific examples thereof include bis(2,6-dichloro-benzoyl)phenyl phosphine oxide, bis(2,6-dichloro-benzoyl)-2,5-dimethyl phenyl phosphine oxide, bis(2,6-dichloro-benzoyl)-4-ethoxy phenyl phosphine oxide, bis(2,6-dichloro-benzoyl)-4-propyl phenyl phosphine oxide, bis(2,6-di chloro-benzoyl)-2-naphthyl phosphine oxide, bis(2,6-dichloro-benzoyl)-1-naphthyl phosphine oxide, bis(2,6-dichloro-benzoyl)-4-chlorophenyl phosphine oxide, bis(2,6-dichloro-benzoyl)-2,4-dimethoxy-phenyl phosphine oxide, bis(2,6-dichloro-benzoyl)decyl phosphine oxide, bis(2,6-dichloro-benzoyl)-4-octyl phenyl phosphine oxide, bis(2,4,6-trimethyl benzoyl)phenyl phosphine oxide, bis(2,4,6-trimethyl benzoyl)-2,5-dimethyl phenyl phosphine oxide, bis(2,6-dichloro-3,4,5-trimethoxy benzoyl)-2,5-dimethyl phenyl phosphine oxide, bis(2,6-dichloro-3,4,5-trimethoxy benzoyl)-4-ethoxy phenyl phosphine oxide, bis(2-methyl-1-naphthoyl)-2,5-dimethyl phenyl phosphine oxide, bis(2-methyl-1-naphthoyl)-4-ethoxy phenyl phosphine oxide, bis(2-methyl-1-naphthoyl)-2-naphthyl phosphine oxide, bis(2-methyl-1-naphthoyl)-4-propyl phenyl phosphine oxide, bis (2-methyl-1-naphthoyl)-2,5-dimethyl phenyl phosphine oxide, bis(2-methoxy-1-naphthoyl)-4-ethoxy phenyl phosphine oxide, bis(2-chloro-1-naphthoyl)-2,5-dimethyl phenyl phosphine oxide, bis(2,6-dimethoxy benzoyl)-2,4,4-trimethyl pentyl phosphine oxide, or the like.

Among these, as bisacylphosphine oxide compounds, his (2,4,6-trimethyl benzoyl)phenyl phosphine oxide (Irgacure 819, BASF Japan Co., Ltd), and bis(2,6-dimethoxy benzoyl)-2,4,4-trimethyl pentyl phenyl phosphine oxide are preferable, and his (2,4,6-trimethyl benzoyl)phenyl phosphine oxide is particularly preferable.

<Compound Represented By Formula (1)>

The ink composition of the present invention preferably contains a compound which is represented by Formula (1) or a compound which is represented by Formula (2) to be described later as a polymerization initiator and more preferably contains at least a compound which is represented by Formula (1). With the above-described aspect, it is possible to obtain a printed material where the migration is further suppressed and there is little odor.

[Chem. 4]

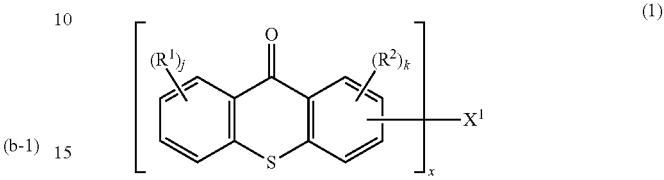

(1)

(In Formula (1), $R^1$ and $R^2$ each independently represent an alkyl group which has a carbon number of 1 to 5 or a halogen atom, j represents an integer of 0 to 4, k represents an integer of 0 to 3, x represents an integer of 2 to 4, and, when j and k are integers or two or more, $R^1$ and $R^2$, which are present as a plurality, may each be the same or different, and $X^1$ represents an x valent hydrocarbon chain which has a carbon number of 2 to 300 which may include an ester bond and/or an ether bond.)

In Formula (1), R1 and R2 each independently represent an alkyl group which has a carbon number of 1 to 5 or a halogen atom. The alkyl group which has a carbon number of 1 to 5 may be any of straight-chain, branched, or cyclic; however, straight-chain or branched is preferable, and an alkyl group which has a carbon number of 1 to 4 is preferable, an alkyl group which has a carbon number of 2 to 3 is more preferable, and an ethyl group or an isopropyl group is even more preferable. Examples of the halogen atoms include fluorine atoms, chlorine atoms, iodine atoms and bromine atoms, with chlorine atoms being preferable. $R^1$ and $R^2$ are particularly preferably an ethyl group, an isopropyl group, or a chlorine atom.

In Formula (1), j represents an integer of 0 to 4, 0 to 2 is preferable, and 0 or 1 is more preferable. In a case where j is 2 or more, $R^1$, which is present as a plurality, may each be the same or different.

In Formula (1), k represents an integer of 0 to 3, 0 to 2 is preferable, 0 or 1 is more preferable, and 0 is even more preferable. In a case where k is an integer of 2 or more, $R^2$, which is present as a plurality, may each be the same or different.

In Formula (1), x represents an integer of 2 to 4, 3 or 4 is more preferable, and 4 is even more preferable.

In Formula (1), $X^1$ represents an x valent linking group which is consisting of an x valent hydrocarbon chain which has a carbon number of 2 to 300 which may include an ether bond (—O—) and/or an ester bond (—(C═O)—O—).

Here, in the Formula (1), there are a plurality (x) of thioxanthone structures (in Formula (1), structures represented in "□") excluding $X^1$ which is a linking group; however, these may be the same as each other or different and are not particularly limited. From the point of view of synthesis, the structures are preferably the same.

In the compound which is represented by the Formula (1), the substitution position on the thioxanthone is set to be represented as follows.

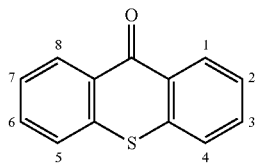

The substitution position of $X^1$ is the first to the fourth position, and the second position, the third position or the fourth position is preferable, the second position or the fourth position is more preferable, and the fourth position is even more preferable.

The substitution position of $R^1$ is the fifth to the eighth position, the sixth position and the seventh position are preferable, and the sixth position is more preferable.

In addition, the substitution position of $R^2$ is the first to the fourth position, the first position, the second position, and the third position are preferable, and the first position is more preferable.

The compounds which are represented by the Formula (1) are preferably represented by the following Formula (1').

[Chem. 6]

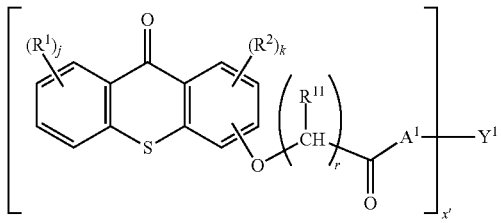

(1')

In Formula (1'), $R^1$, $R^2$, j and k are the same as $R^1$, $R^2$, j and k in Formula (1), and the preferable ranges are also the same.

In Formula (1'), $R^{11}$ each independently represent a hydrogen atom or an alkyl group which has a carbon number of 1 to 4, and a hydrogen atom, a methyl group, or an ethyl group are preferable, with a hydrogen atom being more preferable.

In Formula (1'), r each independently represent an integer of 1 to 6, and an integer of 1 to 3 is preferable, 1 or 2 is more preferable, and 1 is even more preferable. In addition, when r is 2 or more, $R^{11}$, which is present as a plurality, may each be the same or different.

x' represents an integer of 2 to 4, preferably 2 or 3, and more preferably 2.

$Y^1$ represents a residue where hydrogen atoms of x' hydroxy groups are removed from polyhydroxy compounds which have at least x' hydroxy groups, and a residue where hydrogen atoms of all (x') the hydroxy groups are removed from polyhydroxy compounds which have x' hydroxy groups is preferable. Specifically, a residue where the hydrogen atoms of x' hydroxy groups are removed from polyhydroxy compounds which are selected from a group consisting of ethylene glycol, propylene glycol, butylene glycol, glycerin, trimethylol propane, ditrimethylolpropane, and pentaerythritol is preferable, and additionally, a residue where the hydrogen atoms of all the hydroxy groups are removed is preferable.

In Formula (1'), $A^1$ represents a group which is selected from a group constiting of the following (i) to (iii).

[Chem. 7]

*—[O(CHR$^{12}$CHR$^{13}$)$_a$]$_d$—**     (i)

*—[O(CH$_2$)$_b$CO]$_d$—*     (ii)

*—[O(CH$_2$)$_b$CO]$_{(d-1)}$—[O(CHR$^{12}$CHR$^{13}$)$_a$]$_d$—**     (iii)

(In Formula (i) to Formula (iii), one of $R^{12}$ and $R^{13}$ represents a hydrogen atom and the other represents a hydrogen atom, a methyl group, and an ethyl group; a represents an integer of 1 or 2; b represents an integer of 4 or 5; and d represents an integer of 1 to 20. Here, * indicates the bonding position with the carbonyl carbon and ** indicates the bonding position with $Y^1$.)

$A^1$ is preferably a group which is represented by the Formula (i), and *—(OCH$_2$CH$_2$)$_d$—**, *—(OCH$_2$CH$_2$CH$_2$CH$_2$)$_d$—**, or *—O(CH(CH$_3$)CH$_2$)$_d$—** is more preferable. In such a case, d is more preferably an integer of 3 to 10.

The molecular weight of the compound which is represented by the Formula (1) is preferably 500 to 3000, more preferably 800 to 2500, and even more preferably 1000 to 2000.

When the molecular weight is 500 or more, the elution of the compound from the cured film is suppressed and it is possible to obtain an ink composition where migration, odor, and blocking are suppressed. On the other hand, when the molecular weight is 3000 or less, the steric hindrance of the molecule is small and, in addition, the degree of freedom in the liquid/film of the molecule is maintained and it is possible to obtain a high sensitivity.

Here, in a case where a compound which is represented by the Formula (1) is a mixture of a plurality of compounds where the carbon numbers and the like are different, the weight average molecular weight is preferably in the range described above.

Below specific examples of compounds which are represented by Formula (1) are indicated; however, the present invention is not limited to the following compounds.

[Chem. 8]

I-A

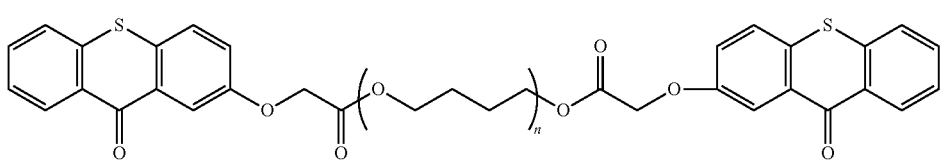

n = 1-20

-continued
I-B
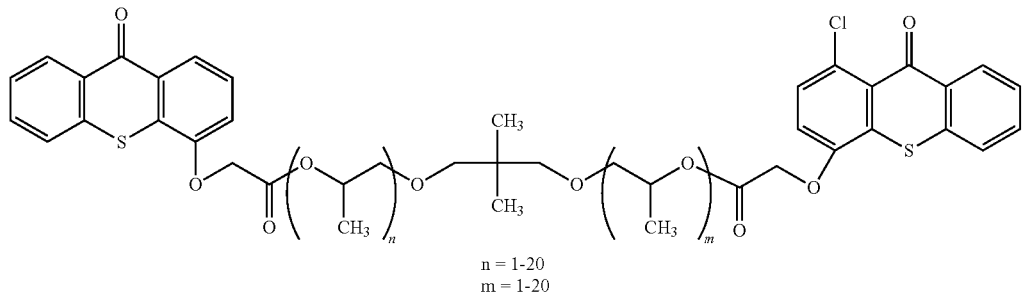
n = 1-20
m = 1-20
I-C
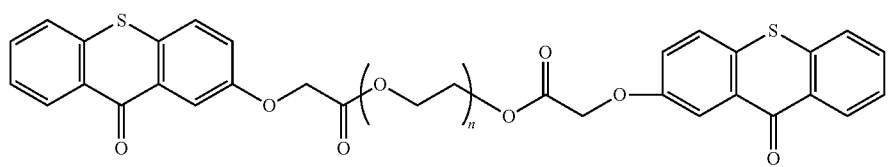
n = 1-20
[Chem. 9]
I-D
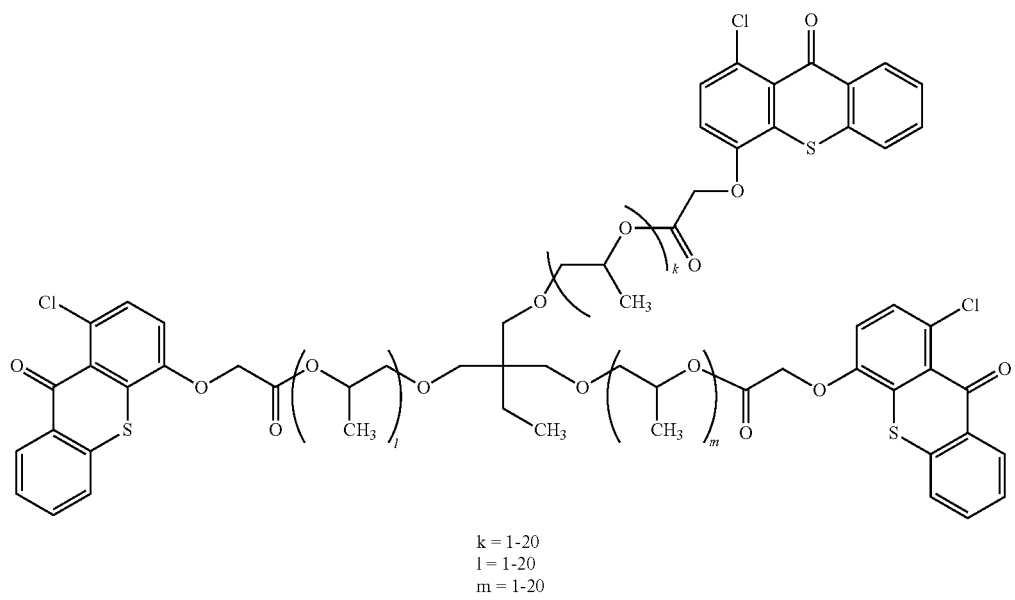
k = 1-20
l = 1-20
m = 1-20

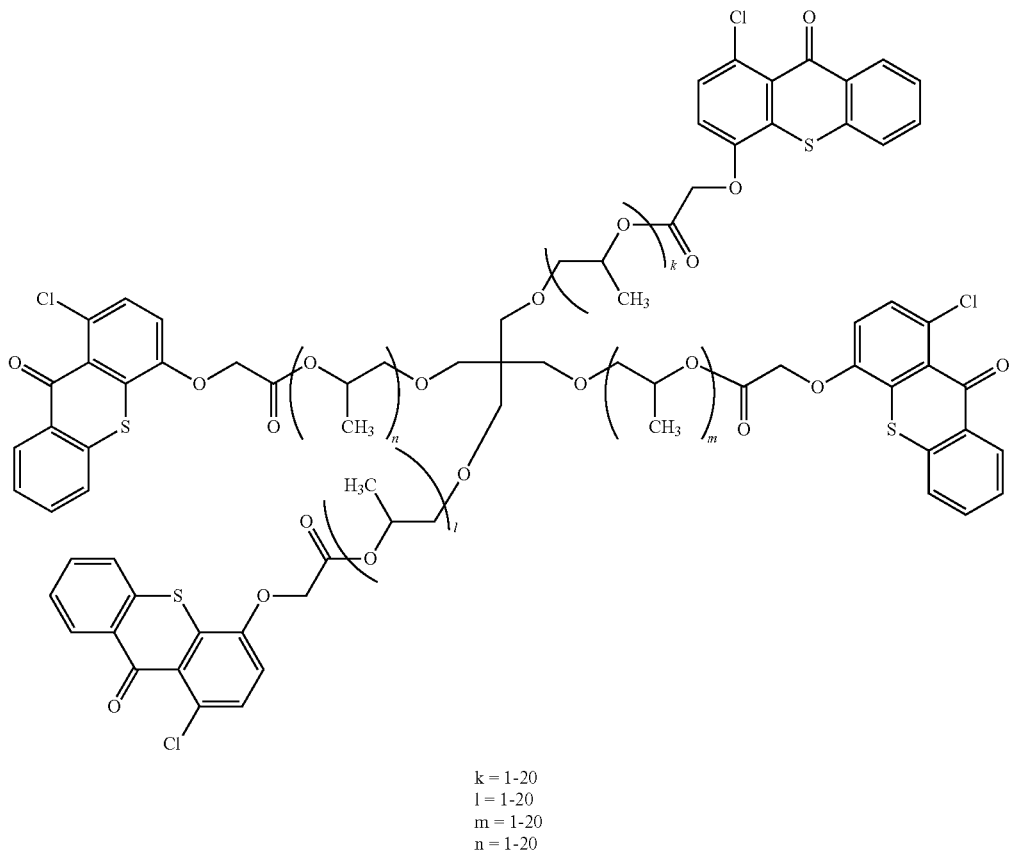

k = 1-20
l = 1-20
m = 1-20
n = 1-20

Even among these, the compound (1-A) or (1-E) is preferable, and the compound (1-E) is more preferable As the compound which is represented by Formula (1), it is possible to use a commercial compound. Specifically, examples include SPEEDCURE 7010 (1,3-di({α-[1-chloro-9-oxo-9H-thioxanthen-4-yl]oxy}acetylpoly[oxy(1-methylethylene)])oxy)-2,2-bis({α-[1-chloro-9-oxo-9H-thioxanthen-4-yl]oxy}acetylpoly[oxy(1-methylethylene)]) oxymethyl)propane, CAS No 1003567-83-6, manufactured by Lambson Co., Ltd.), OMNIPOL TX (polybutylene glycol bis(9-oxo-9H-thioxanthenyloxy)acetate, CAS No. 813452-37-8, manufactured by Insight High Technology Co., Ltd.).

It is possible for the compounds which are represented by Formula (1) to be manufactured using a known reaction, which is not particularly limited; however, for example, it is possible for the compounds which are represented by the above-described Formula (1') to be prepared by reacting a compound which is represented by the following Formula (1-1) and a compound which is represented by the following Formula (1-2).

[Chem. 10]

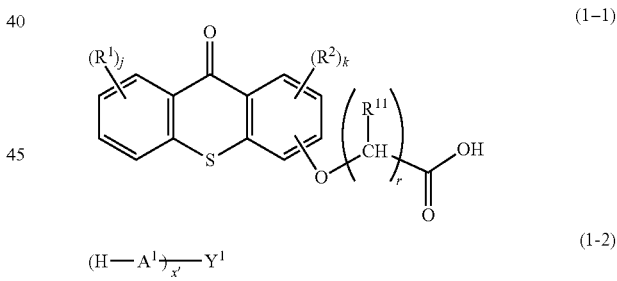

In Formula (1-1) and Formula (1-2), $R^1$, $R^2$, $R^{11}$, $A^1$, $Y^1$, j, k, r, and x are the same as in Formula (1') and the preferable ranges are also the same.

The above-described reaction is preferably performed in the presence of a solvent and examples of suitable solvents include aromatic hydrocarbons such as benzene, toluene, and xylene.

In addition, the reaction is preferably performed in the presence of a catalyst, and examples of the catalyst include sulfonic acid (for example, p-toluene sulfonic acid, and methane sulfonic acid), inorganic acids (for example, sulfuric acid, hydrochloric acid, and phosphoric acid), Lewis acids (aluminum chloride, boron trifluoride, and organotitanates) and the like.

The reaction temperature and reaction time are not particularly limited.

After the completion of the reaction, it is possible to separate the product by isolation from the reaction mixture using known means, washing as necessary, and performing drying.

<Compound Represented By Formula (2)>

The ink composition of the present invention preferably contains a compound which is represented by Formula (2) as a polymerization initiator. With the above-described aspect, it is possible to obtain a printed material where the migration is further suppressed and there is little odor.

[Chem. 11]

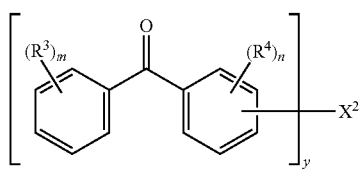

(2)

(In Formula (2), $R^3$ and $R^4$ each independently represent an alkyl group which has a carbon number of 1 to 5 or a halogen atom, m represents an integer of 0 to 4, n represents an integer of 0 to 3, y represents an integer of 2 to 4, and, when m and n are integers of 2 or more, $R^3$ and $R^4$, which are present as a plurality, may each be the same or different, and $X^2$ represents a hydrocarbon chain with y valence which has a carbon number of 2 to 300 which may include an ether bond and/or an ester bond.)

In Formula (2), $R^3$ and $R^4$ each independently represent an alkyl group which has a carbon number of 1 to 5 or a halogen atom. The alkyl group which has a carbon number of 1 to 5 may be any of straight-chain, branched, or cyclic; however, straight-chain or branched is preferable, and an alkyl group which has a carbon number of 1 to 4 is preferable, an alkyl group which has a carbon number of 2 to 3 is more preferable, and an ethyl group or an isopropyl group is even more preferable. Examples of the halogen atoms include fluorine atoms, chlorine atoms, iodine atoms and bromine atoms, with chlorine atoms being preferable. $R^3$ and $R^4$ are particularly preferably an ethyl group, an isopropyl group, or a chlorine atom.

In Formula (2), m represents an integer of 0 to 4, preferably 0 to 2, and more preferably 0 or 1. In a case where m is an integer of 2 or more, $R^3$, which is present as a plurality, may each be the same or different.

In Formula (2), n represents an integer of 0 to 3, preferably 0 to 2, more preferably 0 or 1, and particularly preferably 0. In a case where n is an integer of 2 or more, $R^4$, which is present as a plurality, may each be the same or different.

In Formula (2), y represents an integer of 2 to 4, more preferably 2 or 3, and even more preferably 2.

In Formula (2), $X^2$ represents an y valent linking group which is consisting of an y valent hydrocarbon chain which has a carbon number of 2 to 300 which may include an ether bond (—O—) and/or an ester bond (—(C=O)—O—).

Here, in Formula (2), there are a plurality (y) of benzophenone structures (in Formula (2), structures represented in "☐") excluding $X^2$ which is a linking group; however, these may be the same as each other or different and are not particularly limited. From the point of view of synthesis, the structures are preferably the same.

In the compound which is represented by the Formula (2), the substitution position on the benzophenone is set to be represented as follows.

[Chem. 12]

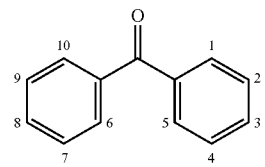

The substitution position of $X^2$ is the first to the fifth position, and the second position, the third position or the fourth position is preferable, and the third position is more preferable.

The substitution position of $R^3$ is the sixth to the tenth position.

In addition, the substitution position of $R^4$ is the first to the fifth position.

The compound which is represented by Formula (2) is preferably a compound which is represented by the following Formula (2').

[Chem. 13]

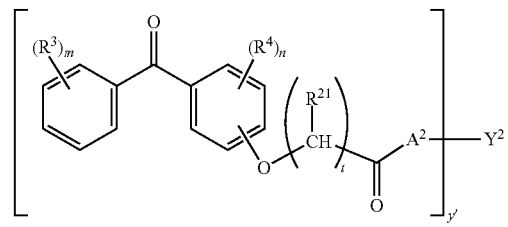

(2')

In Formula (2'), $R^3$, $R^4$, m, and n are the same as $R^3$, $R^4$, m, and n in Formula (2), and the preferable ranges are also the same.

In Formula (2'), $R^{21}$ each independently represent a hydrogen atom or an alkyl group which has a carbon number of 1 to 4, and a hydrogen atom, a methyl group, or an ethyl group are preferable, with a hydrogen atom being more preferable.

In Formula (2'), t each independently represent an integer of 1 to 6, preferably an integer of 1 to 3, more preferably 1 or 2, and even more preferably 1. In addition, when t is 2 or more, $R^{21}$, which is present as a plurality, may each be the same or different.

y' represents an integer of 2 to 4, preferably 2 or 3, and even more preferably 2.

$Y^2$ represents a residue where hydrogen atoms of y' hydroxy groups are removed from polyhydroxy compounds which have at least y' hydroxy groups, and a residue where hydrogen atoms of all (y') the hydroxy groups are removed from polyhydroxy compounds which have y' hydroxy groups is preferable. Specifically, a residue where the hydrogen atoms of x' hydroxy groups are removed from polyhydroxy compounds which are selected from a group consisting of ethylene glycol, propylene glycol, butylene glycol, glycerin, trimethylol propane, ditrimethylolpropane, and pentaerythritol is preferable, and additionally, a residue where the hydrogen atoms of all the hydroxy groups are removed is preferable.

In Formula (2'), $A^2$ represents a group which is selected from a group consisting of the following (i) to (iii).

[Chem. 14]

$$*—[O(CHR^{12}CHR^{13})_a]_d—** \quad (i)$$

$$*—[O(CH_2)_bCO]_d—** \quad (ii)$$

$$*—[O(CH_2)_bCO]_{(d-1)}—[O(CHR^{12}CHR^{13})_a]—** \quad (iii)$$

(In Formula (i) to Formula (iii), one of $R^{12}$ and $R^{13}$ represents a hydrogen atom and the other represents a hydrogen atom, a methyl group, and an ethyl group; a represents an integer of 1 or 2; b represents an integer of 4 or 5; and d represents an integer of 1 to 20. Here, * indicates the bonding position with the carbonyl carbon and ** indicates the bonding position with $Y^2$.)

$A^2$ is preferably a group which is represented by Formula (1), and $*—(OCH_2CH_2)_d—**$, $*—(OCH_2CH_2CH_2CH_2)_d—**$, or $*—O(CH(CH_3)CH_2)_d—**$ is more preferable. In such a case, d is more preferably an integer of 3 to 10.

The molecular weight of the compound which is represented by the Formula (2) is preferably 500 to 3000, more preferably 800 to 2500, and even more preferably 1000 to 2000.

When the molecular weight is 500 or more, the elution of the compound from the cured film is suppressed and it is possible to obtain an ink composition where migration, odor, and blocking are suppressed. On the other hand, when the molecular weight is 3000 or less, the steric hindrance of the molecule is small and, in addition, the degree of freedom in the liquid/film of the molecule is maintained and it is possible to obtain a high sensitivity.

Here, in a case where a compound which is represented by the Formula (2) is a mixture of a plurality of compounds where the carbon numbers and the like are different, the weight average molecular weight is preferably in the range described above.

Below, specific examples of compounds which are represented by Formula (2) are indicated; however, the present invention is not limited to the following compounds

[Chem. 15]

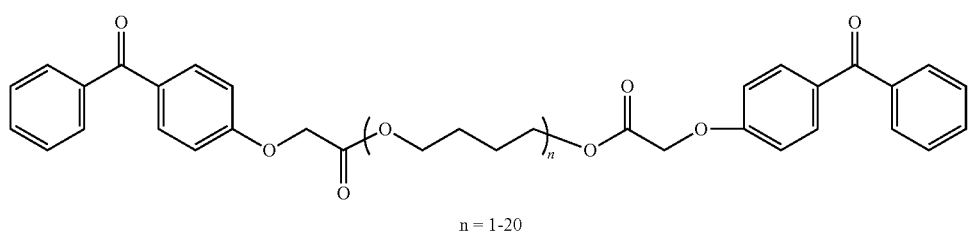

I-F n = 1-20

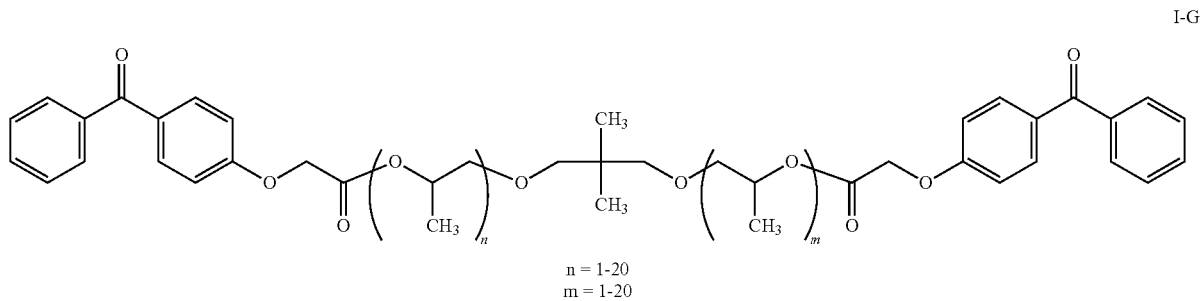

I-G n = 1-20
m = 1-20

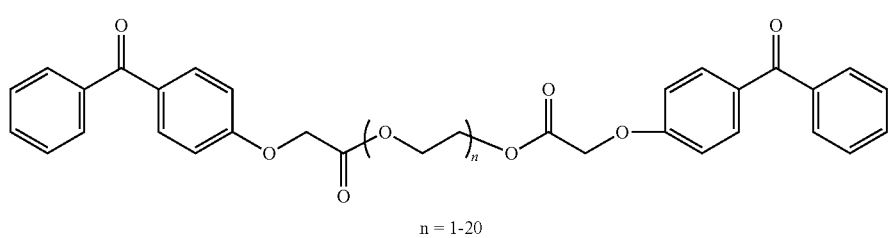

I-H n = 1-20

[Chem. 16]

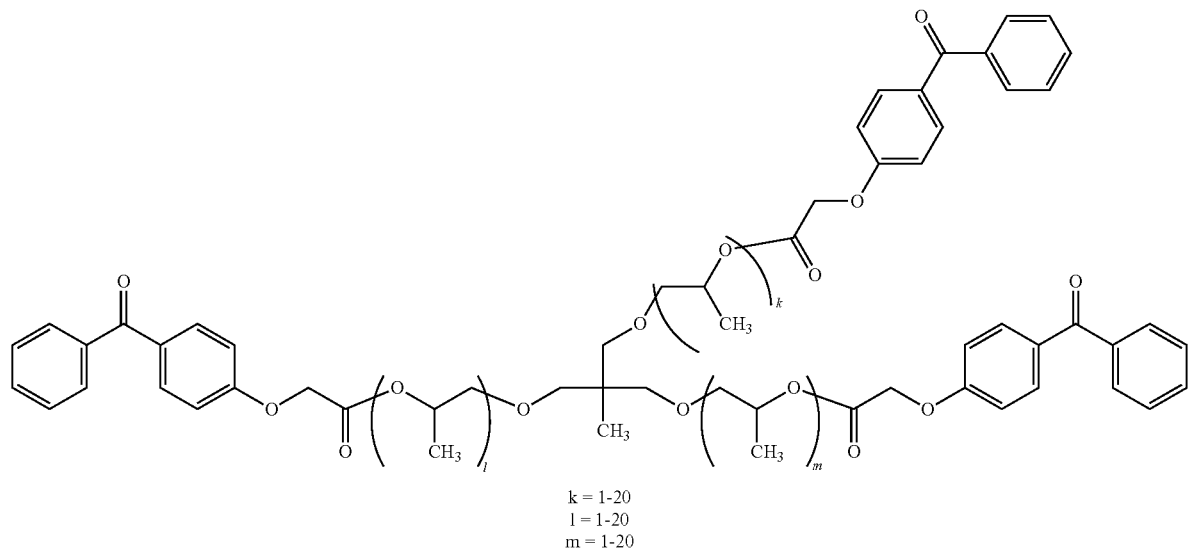

I-I k = 1-20
l = 1-20
m = 1-20

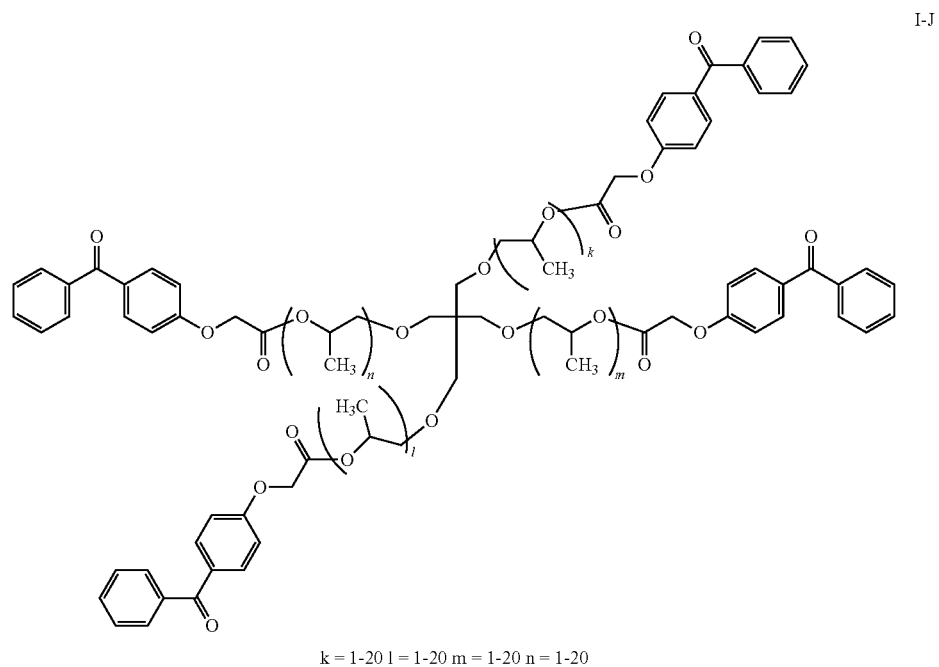

I-J k = 1-20  l = 1-20  m = 1-20  n = 1-20

As the compound which is represented by Formula (2), it is possible to use a commercial compound. Specifically, examples include OMNIPOL BP (polybutyleneglycol bis(4-benzoylphenoxy)acetate, CAS No. 515136-48-8, manufactured by Insight High Technology Co., Ltd.).

It is possible for the compounds which are represented by Formula (2) to be manufactured using a known reaction, which is not particularly limited; however, for example, it is possible for the compounds which are represented by the above-described Formula (2') to be prepared by reacting a compound which is represented by the following Formula (2-1) and a compound which is represented by the following Formula (2-2).

[Chem. 17]

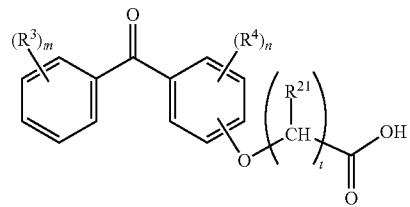

(2-1)

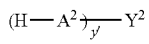

In Formula (2-1) and Formula (2-2), $R^3$, $R^4$, $R^{21}$, $A^2$, $Y^2$, n, t, and y are the same as in Formula (2'), and the preferable ranges are also the same.

The above-described reaction is preferably performed in the presence of a solvent and examples of suitable solvents include aromatic hydrocarbons such as benzene, toluene, and xylene.

In addition, the reaction is preferably performed in the presence of a catalyst, and examples of the catalyst include sulfonic acid (for example, p-toluene sulfonic acid, and methane sulfonic acid), inorganic acids (for example, sulfuric acid, hydrochloric acid, and phosphoric acid), Lewis acids (aluminum chloride, boron trifluoride, and organotitanates) and the like.

The reaction temperature and reaction time are not particularly limited.

After the completion of the reaction, it is possible to separate the product by isolation from the reaction mixture using known means, washing as necessary, and performing drying.

From the point of view of increasing sensitivity and suppressing migration, odor, and blocking in the ink composition of the present invention, combining a bisacylphosphine compound and a compound which is represented by Formula (1) or Formula (2) as the polymerization initiator is preferable, and combining a bisacylphosphine compound and a compound which is represented by Formula (1) is particularly preferable.

From the point of view of increasing sensitivity and suppressing migration, odor, and blocking, the total content of the compound which is represented by Formula (1) and the compound which is represented by Formula (2) is preferably 1 to 10 mass % of the entire ink composition, more preferably 1 to 5 mass %, and even more preferably 2 to 4 mass %.

From the point of view of increasing sensitivity and suppressing migration, odor, and blocking, the content of the bisacylphosphine compound is preferably 1 to 10 mass % of the entire ink composition, more preferably 1 to 5 mass %, and even more preferably 2 to 4 mass %.

In addition, examples of other polymerization initiators include α-amino ketone compounds.

It is possible to use known compounds as α-amino ketone compounds without being particularly limited; however, among the compounds which are represented by the following Formula (b-2), compounds where the molecular weight exceeds 354 are preferable. Here, the α-amino ketone compound component may be used alone, or a plurality of types may be combined.

[Chem. 18]

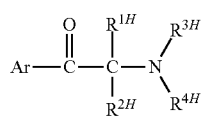

In the Formula (b-2), Ar represents a phenyl group which is substituted with $-SR^{5H}$ or $-N(R^{7H})(R^{8H})$, $R^{5H}$ represents a hydrogen atom or an alkyl group, $R^{1H}$ and $R^{2H}$ each independently represent an alkyl group which has a carbon number of 1 to 8, $R^{3H}$ and $R^{4H}$ each independently represent a hydrogen atom, an alkyl group which has a carbon number of 1 to 12, an alkyl group which has a carbon number of 2 to 4 which is substituted with an alkoxy group which has a carbon number of 1 to 4, or an alkenyl group which has a carbon number of 3 to 5. An alkylene group which has a carbon number of 2 to 9 may be configured by bonding $R^{1H}$ and $R^{2H}$ to each other. An alkylene group which has a carbon number of 3 to 7 may be formed by bonding $R^{3H}$ and $R^{4H}$ to each other, and the alkylene group may be a group which includes —O— or —N($R^{6H}$)— in the alkylene chain. $R^{6H}$ represents an alkyl group which has a carbon number of 1 to 4. $R^{7H}$ and $R^{8H}$ each independently represent a hydrogen atom, an alkyl group which has a carbon number of 1 to 12, an alkyl group which has a carbon number of 2 to 4 which is substituted with an alkoxy group which has a carbon number of 1 to 4, or an alkenyl group which has a carbon number of 3 to 5. An alkylene group which has a carbon number of 3 to 7 may be formed by bonding $R^{7H}$ and $R^{8H}$ to each other, and the alkylene group may be a group which includes —O— or —N($R^{6H}$)— in the alkylene chain. Here, $R^{6H}$ has the same meaning as described above.

Examples of the α-amino ketone compounds include 2-benzyl-2-dimethylamino-1-(4-morpholinophenyl)-butanone-1 (IRGACURE 369, manufactured by BASF Co., Ltd.), 2-dimethylamino-2-(4-methyl benzyl)-1-(4-morpholin-4-yl-phenyl)-butane-1-on (IRGACURE 379, manufactured by BASF Co., Ltd.).

In addition, polymer α-amino ketone compounds are also preferable, specific examples including polyethyleneglycoldi{β3-4-[4-(2-dimethylamino-2-benzyl) butanoyl phenyl]piperazine} (OMNIPOL 910, average molecular weight of 1,032, manufactured by Insight High Technology Co., Ltd.).

Examples of other polymerization initiators include SPEEDCURE ITX manufactured by Lambson Co., Ltd., LUORIN TPO, IRGACURE 184, IRGACURE 907, and the like manufactured by BASF Co., Ltd.).

The ink composition of the present invention may contain a compound which functions as a sensitizer (referred to below as "sensitizer") as a polymerization initiator, in order to promote the decomposition of the polymerization initiator by absorbing specific active rays.

Examples of the sensitizer include polynuclear aromatics (for example, pyrene, perylene, triphenylene, 2-ethyl-9,10-dimethoxy-anthracene, or the like), xanthenes (for example, fluorescein, eosin, erythrosine, rhodamine B, rose bengal, or the like), cyanines (for example, thiacarbocyanine, oxacarbocyanine, or the like), merocyanines (for example, merocyanine, carbo merocyanine or the like), thiazine type (for example, thionine, methylene blue, toluidine blue, or the like), acridines (for example, acridine orange, chloro flavin, acriflavine and the like), anthraquinones (for example, anthraquinone, or the like), squarylium (for example, squarylium or the like), coumarins (for example, 7-diethylamino-4-methyl coumarin, or the like), and the like.

In addition, the sensitizer may be used alone or two or more types may be used in combination.

The total content of the polymerization initiator combined with the other polymerization initiators is preferably 1.0 to 15.0 mass % of the total ink composition, more preferably 1.5 to 10.0 mass %, and even more preferably 1.5 to 7.0 mass %. Within the above-described ranges, the curability is excellent.

(Component D) Other Polymerizable Compounds

The ink composition of the present invention may contain other polymerizable compounds than component A and component B.

As the other polymerizable compounds, ethylenically unsaturated compounds are preferable.

As the other polymerizable compounds, it is possible to use a known polymerizable compound, and examples thereof include (meth)acrylate compounds, vinyl ether compounds, allyl compounds, n-vinyl compounds, unsaturated carboxylic acids, and the like other than component A and component B. Examples thereof include radical polymerizable monomers which are described in JP2009-221414, polymerizable compounds which are described in JP2009-209289, and ethylenically unsaturated compounds which are described in JP2009-191183.

As the other polymerizable compounds, (meth)acrylate compounds are preferable, and acrylate compounds are more preferable.

In addition, the ink composition of the present invention preferably contains multifunctional polymerizable compounds other than component A and component B as the other polymerizable compounds, more preferably contains multifunctional (meth)acrylate compounds other than component A and component B, and even more preferably bifunctional (meth)acrylate compounds other component A and component B. With the above-described aspect, migration and odor are further suppressed.

Preferable examples of the bifunctional (meth)acrylate compounds other than component A and component B include alkylene diol di(meth)acrylate, and more preferably include alkylene diol diacrylate. With the above-described aspect, migration and odor are further suppressed.

Preferable examples of the bifunctional (meth)acrylate compounds other than component A and component B specifically include dipropylene glycol di(meth)acrylate, tripropylene glycol di(meth)acrylate, neopentyl glycol di(meth)acrylate, EO-modified neopentyl glycol di(meth)acrylate with a molecular weight of less than 315, PO-modified neopentyl glycol di(meth)acrylate with a molecular weight of less than 315, pentanediol di(meth)acrylate, hexanediol di(meth)acrylate, heptanediol di(meth)acrylate, octanediol di(meth)acrylate, nonanediol di(meth)acrylate, decanediol di(meth)acrylate, and dodecanediol diacrylate.

In addition, the content of the bifunctional (meth)acrylate compound including component A and component B in the ink composition of the present invention is preferably 75 to 99 mass % with respect to the ink composition, more preferably 80 to 95 mass %.

In addition, examples of the other polymerizable compounds preferably include compounds which have a vinyloxy group and a (meth)acryloxy group, more preferably acrylate 2-(2-vinyloxyethoxy)ethyl, and methacrylate 2-(2-vinyloxyethoxy)ethyl.

Furthermore, examples of the other polymerizable compounds include unsaturated carboxylic acids and salts thereof such as acrylic acid, methacrylic acid, itaconic acid, crotonic acid, isocrotonic acid, and maleic acid; anhydrides which have an ethylenically unsaturated group; and radical polymerizable compounds such as acrylonitrile, styrene, various other types of unsaturated polyester, unsaturated polyethers, unsaturated polyamide, and unsaturated urethanes.

Specific examples of the other polymerizable compounds include (meth)acrylic acid derivatives such as t-butyl cyclohexyl(meth)acrylate, dicyclopentenyloxy(meth)acrylate, phenoxyethyl(meth)acrylate, trimethylolpropane tri(meth)acrylate, isodecyl(meth)acrylate, 2-ethylhexyl(meth)acrylate, 2-hydroxyethyl(meth)acrylate, butoxyethyl(meth)acrylate, carbitol (meth)acrylate, cyclohexyl(meth)acrylate, tetrahydrofurfuryl(meth)acrylate, benzyl(meth)acrylate, methyl(meth)acrylate, n-butyl(meth)acrylate, allyl(meth)acrylate, glycidyl(meth)acrylate, dimethyl amino methyl (meth)acrylate, N-methylol (meth)acrylamide, diacetone (meth)acrylamide, and epoxy(meth)acrylates; and derivatives of allyl compounds such as allyl glycidyl ether, diallyl phthalate, and triallyl trimellitate.

In addition, for the ink composition of the present invention, the content of the monofunctional polymerizable compound is preferably 5 mass % or less with respect to the entire (total mass of) the ink composition, more preferably 1 mass % or less, even more preferably 0.5 mass % or less, and the monofunctional polymerizable compound is particularly preferably not contained.

More specifically, it is possible to use commercial products which are described in "Cross-linking Agent Handbook" Third Edition by Shinzo Yamashita, (1981, Taiseisha, Co., Ltd.); "UV-EB Curing Handbook (Raw Materials Edition)" edited by Kiyoshi Kato, (1985, Polymer Publication Society); "Application and Market of UV-EB Curing Technology" edited by RadTech Japan, p. 79 (1989, CMC Publishing); "Polyester Resin Handbook" by Eiichiro Takiyama, (1988, Nikkankogyo Shimbun), or the like; or radically polymerizable or cross-linkable monomers, oligomers or polymers known in the related art.

The molecular weight of the other polymerizable compound is preferably 80 to 2,000, more preferably 80 to 1,000, and even more preferably 80 to 800.

The use of vinyl ether compounds as the other polymerizable compounds is also preferable and broad division into mono vinyl ether compounds and di or tri vinyl ether compounds is possible.

Preferably used vinyl ether compounds include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, and trimethylolpropane tri vinyl ether; and mono vinyl ether compounds such as ethylene glycol monovinyl ether, triethylene glycol monovinyl ether, hydroxyethyl mono vinyl ether, ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, hydroxy nonyl mono vinyl ether, cyclohexanedimethanol mono vinyl ether, n-propyl vinyl ether, isopropyl vinyl ether, isopropenyl vinyl ether, dodecyl vinyl ether, and diethylene glycol mono vinyl ether.

In a case where the ink composition of the present invention contains another polymerizable compound, the content of the other polymerizable compound in the ink composition of the present invention is preferably 1 to 70 mass % with respect to the total mass of the ink composition, more preferably 10 to 60 mass %, and particularly preferably 15 to 55 mass %.

(Component E) Surfactant

A surfactant may be added to the ink composition of the present invention in order to impart long-term ejection stability.

Examples of the surfactants include surfactants which are described in each publication of JP1987-173463 (JP-S62-173463), and JP1987-183457 (JP-S62-183457). Examples thereof include anionic surfactants such as dialkyl sulfosuccinate salts, alkyl naphthalene sulfonic acid salts, and fatty acid salts; non-ionic surfactants such as polyoxyethylene alkyl ethers, polyoxyethylene alkyl allyl ethers, acetylene glycols, and polyoxyethylene-polyoxypropylene block copolymers; and cationic surfactants such as alkyl amine salts, quaternary ammonium salts, and the like. In addition, fluorine-based surfactants (for example, organic fluoro compounds or the like) or silicone-based surfactants (for example, polysiloxane compounds) may be used as the surfactant. The organic fluoro compounds are preferably hydrophobic. The organic fluoro compounds include, for example, fluorine-based surfactants, oily fluorine-containing compounds (for example, fluorine based oils) and solid fluorine compound resins (for example, tetrafluoroethylene resin), and examples thereof include those described in each publication of JP1982-9053B (JP-S57-9053B) (columns 8 to 17), and JP1987-135826 (JP-S62-135826). The polysiloxane compound is preferably a modified polysiloxane compound where an organic group is introduced into a part of a methyl group of dimethyl polysiloxane. Examples of the modification include polyether modification, methyl styrene modification, alcohol modification, alkyl modification, aralkyl modification, fatty acid ester modification, epoxy modification, amine modification, amino modification, mercapto modification, and the like; however, the invention is not particularly limited to the above. The methods of modification may be used in combination. In addition, among these, the polyether-modified polysiloxane compounds are preferable from the point of view of improving the ejection stability in the ink jet. Examples of the polyether-modified polysiloxane compound include SILWET L-7604, SILWET L-7607N, SILWET FZ-2104, SILWET FZ-2161 (manufactured by Nippon Unicar Co., Ltd.), BYK306, BYK307, BYK331, BYK333, BYK347, BYK348, and the like (manufactured by BYK Chemie Co., Ltd.), KF-351A, KF-352A, KF-353, KF-354L, KF-355A, KF-615A, KF-945, KF-640, KF-642, KF-643, KF-6020, X-22-6191, X-22-4515, KF-6011, KF-6012, KF-6015, and KF-6017 (manufactured by Shin-Etsu Chemical Co., Ltd.).

Among these, silicone-based surfactants are preferable.

The content of the surfactant in the ink composition of the present invention is appropriately selected according to the intended purpose; however, 0.0001 to 1 mass % with respect to the total ink composition is preferable.

(Component F) Coloring Agent

The ink composition of the present invention preferably contains a coloring agent in order to improve the visibility of the formed image portion. The coloring agent is not particularly limited; however, pigment with rich color reproduction and pigments which are oil-soluble, which have excellent weather resistance, are preferable, and it is possible to use a coloring agent which is arbitrarily selected from known soluble pigments. For the coloring agent, a compound which does not function is preferably selected as the polymerization inhibitor from the point of view of not decreasing the sensitivity of the curing reaction due to the active rays.

The pigments which can be used in the present invention are not particularly limited; however, for example, the following numbered organic or inorganic pigments as described in the color index can be used.

As red or magenta pigments, according to the purpose it is possible to use Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, 88, Pigment Orange 13, 16, 20, 36, as blue or cyan pigments, Pigment Blue 1, 15, 15:1, 15:2, 15:3, 15:4, 15:6, 16, 17-1, 22, 27, 28, 29, 36, 60, as a green pigment, Pigment Green 7, 26, 36, 50, as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, 193, as a black pigment, Pigment Black 7, 28, 26, and as a white pigment, pigment white 6, 18, 21.

In the present invention, it is also possible to use a dispersed pigment in a range which dissolves in a water-immiscible organic solvent. The dispersed pigment generally includes water-soluble pigments; however, in the present invention, it is preferably used in a range which dissolves in a water-immiscible organic solvent.

Preferable specific examples of disperse dyes include C. I. and Disperse Yellow 5, 42, 54, 64, 79, 82, 83, 93, 99, 100, 119, 122, 124, 126, 160, 184:1, 186, 198, 199, 201, 204, 224, 237; C. I. Disperse Orange 13, 29, 31:1, 33, 49, 54, 55, 66, 73, 118, 119 and 163; C. I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, 362; C. I. Disperse Violet 33; C. I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; C. I. Disperse Green 6:1 and 9; and the like.

After adding the coloring agent to the ink composition, the coloring agent is preferably appropriately dispersed inside the ink composition. For the dispersion of the coloring agent, it is possible to use various dispersion apparatuses such as a ball mill, a sand mill, an attritor, a roll mill, an agitator, a Henschel mixer, a colloid mill, an ultrasonic homogenizer, a pearl mill, a wet jet mill, and a paint shaker.

The coloring agent is directly added along with each component when preparing the ink composition. In addition, in order to improve dispersibility, it is possible to perform blending after adding in advance to the solvent or the dispersion medium such as the polymerizable compound used in the present invention and carrying out uniform dispersion or dissolution.

In the present invention, in order to avoid the problems of deterioration of the solvent resistance in a case where the solvent remains in the cured image and of VOC (Volatile Organic Compound: volatile organic compounds) of the remaining solvent, the coloring agent is preferably added and blended in advance in a dispersion medium such as a polymerizable compound. Here, in a case where only the point of view of the dispersion suitability is considered, a low viscosity monomer is preferably selected as the polymerizable compound which is used in the adding of the coloring agent. The coloring agent may be appropriately selected and used as one type or two or more types according to the intended purpose of the ink composition.

Here, when a coloring agent such as a pigment which is present as a solid in the ink composition is used, the selection of the coloring agent, the dispersing agent, and the dispersion medium, and the dispersion conditions and filter conditions are preferably set such that the average particle diameter of the coloring agent particles is 0.005 to 0.5 μm, more preferably 0.01 to 0.45 μm, and even more preferably 0.015 to 0.4 μm. The particle diameter management is preferable since the clogging of the head nozzle is suppressed, and it is possible to maintain the storage stability, the transparency, and curing sensitivity of the ink composition.

The content of the coloring agent in the ink composition is appropriately selected according to the color and intended purpose; however, the content is preferably 0.01 to 30 mass % with respect to the total mass of the ink composition.

(Component G) Dispersing Agent

The ink composition of the present invention preferably contains a dispersing agent. In particular, in the case of using a pigment, the dispersing agent is preferably contained in order to stably disperse the pigment in the ink composition. A polymer dispersing agent is preferable as the dispersing agent. Here, "polymer dispersing agent" in the present invention means a dispersing agent where the weight average molecular weight is 1,000 or more.

Examples of the polymer dispersing agent include DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie Co., Ltd.); EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, EFKA7580 (manufactured by EFKA Additives Co., Ltd.); Disperse Aid 6, Disperse Aid 8, Disperse Aid 15, Disperse Aid 9100 (manufactured by San Nopco Co., Ltd.); various SOLSPERSE dispersing agents such as SOLSPERSE (SOLSPERSE) 3000, 5000, 9000, 12000, 13240, 13940, 17000, 22000, 24000, 26000, 28000, 32000, 36000, 39000, 41000, 71000 (manufactured by Noveon, Inc.); Adeka Pluronic L31, F38, L42, L44, L61, L64, F68, L72, P95, F77, P84, F87, P94, L101, P103, F108, L121, P-123 (manufactured by ADEKA Ltd.), Ionetto S-20 (Sanyo Chemical Industries, Ltd.); Disparlon KS-860, 873 SN, 874 (polymer dispersing agent), #2150 (aliphatic polycarboxylic acid), #7004 (polyether ester type) (Kusumoto Kasei Co., Ltd.), and the like.

The content of the dispersing agent in the ink composition is appropriately selected according to the intended purpose; however, the content is preferably 0.05 to 15 mass % with respect to the total mass of the ink composition.

<Other Components>

The ink composition of the present invention includes, in addition to each of the components, as necessary, an ultraviolet absorber, an antioxidant, an anti-fading agent, conductive salts, solvents, a polymer compound, a basic compound, and the like. It is possible to use known components as these other components, and examples thereof include those which are described in JP2009-221416.

In addition, the ink composition of the present invention preferably contains a polymerization inhibitor from the points of view of storability and suppressing head clogging.

The content of the polymerization inhibitor is preferably 200 to 20,000 ppm with respect to the total mass of the ink composition of the present invention.

Examples of the polymerization inhibitor include nitroso-based polymerization inhibitors, hindered amine-based polymerization inhibitors, hydroquinone, benzoquinone, p-methoxy phenol, TEMPO, TEMPOL, Cuperon Al, or the like. Among these, nitroso-based polymerization inhibitors such as Cuperon Al are preferable.

<Physical Properties of Ink>

The ink composition of the present invention is a low viscosity ink composition in order to contain component A as 30 mass % or more of the total ink composition and the viscosity at 25° C. is preferably 5 to 20 mPa·s, more preferably 6 to 15 mPa·s, even more preferably 7 to 14 mPa·s, and particularly preferably 8 to 13 mPa·s. Within the above-described ranges, the continuous ejection stability is excellent.

In addition, the viscosity at the ejection temperature (preferably 25 to 80° C., more preferably 25 to 50° C.) is preferably 4 to 9 mPa·s, more preferably 5 to 8 mPa·s, and even more preferably 6 to 7 mPa·s. The ink composition of the present invention is preferably adjusted to a suitable composition ratio in order that the viscosity is in the above-described ranges. By setting a high viscosity at room temperature (25° C.), even in a case where a porous recording medium (support) is used, the penetration of the ink composition into the recording medium can be avoided and the uncured monomers can be reduced. Further, ink blurring at the time of ink droplet landing of the ink composition can be inhibited, and, as a result, the image quality is improved, which is preferable.

The surface tension of the ink composition of the present invention at 25° C. is preferably 18 nN/m or more and 30 nN/m or less, more preferably 19 nN/m or more and 27.5 nN/m or less, and even more preferably 20 nN/m or more and 25 nN/m or less. Within the above-described ranges, a printed material which is excellent in blocking resistance is obtained.

Here, it is possible to use a known method as the measurement method of the surface tension of the ink composition at a temperature of 25° C.; however, measurement is preferably performed using a wheel suspension method or the Wilhelmy method. Preferable examples of the method include a method where measurement is performed using an automatic surface tension meter CBVP-Z manufactured by Kyowa Interface Science Co., Ltd., or a method where measurement is performed using SIGMA702 manufactured by KSV Instruments Ltd.

(Ink Jet Recording Method, Ink Jet Recording Apparatus, and Printed Material)

The ink jet recording method of the present invention is a method where the ink composition of the present invention is ejected onto a recording medium (a support, a recording material, or the like) set for ink jet use, active energy rays are irradiated under a low oxygen partial pressure onto the ink jet ink composition which was ejected onto the recording medium, and an image is formed by curing the ink jet ink composition.

More specifically, the ink jet recording method of the present invention includes (step I) a step of ejecting an ink composition which contains (component A) 3-methyl pentanediol diacrylate as 30 mass % or more of the total ink composition from an ink jet head onto a support, and (step II) a step of irradiating active rays in an atmosphere where the oxygen partial pressure is 0.10 atm or less to cure the ink composition.

The ink jet recording method of the present invention forms an image on the recording medium using the cured ink composition by including step I and step II.

In addition, the ink jet recording method of the present invention may be performed by performing the above-described step I and step II two times or more, that is, by a multi-pass system where the same parts are printed by over-printing thereon; however, the ink jet recording method of the present invention is preferably performed by performing step I and step II only once in the same parts on the recording medium, that is, by a single pass system.

In the ink jet recording method (in particular, a case of using the single pass system) of the present invention, the transport speed of the support is preferably 50 m/min or more, and more preferably 100 m/min or more.

In addition, the printed material of the present invention is a printed material which is recorded by the ink jet recording method of the present invention.

Here, as the support, it is preferable to use a support where the film thickness is 10 μm or more and 90 μm or less and which includes at least one material which is selected from a group consisting of polypropylene, polyethylene, polyethylene terephthalate, and nylon.

In addition, the ink composition of the present invention is suitable for package printing, in particular, suitable for package printing for food wrapping.

It is possible for the ink jet recording method of the present invention to use an ink jet recording apparatus which will be described in detail below.

<Ink Jet Recording Apparatus>

The ink jet recording apparatuses which can be used in the ink jet recording method of the present invention are not particularly limited and a well-known ink jet recording apparatus capable of achieving the desired resolution can be arbitrarily selected and used. That is, with known ink jet recording apparatuses including commercially available products, ejection of the ink composition onto the support can be performed in the step I of the ink jet recording method of the present invention.

Examples of the ink jet recording apparatus which can be used in the present invention include apparatuses including, for example, ink supply systems, temperature sensors, and active energy ray sources.

The ink supply system is formed of, for example, a source tank including the ink composition of the present invention, a supply pipe, an ink supply tank immediately before the ink jet head, a filter and a piezo-type ink jet head. The piezo-type ink jet head is capable of driving so as to be able to eject multi-size dots of preferably 1 to 100 pl and more preferably 8 to 30 pl, at a resolution of preferably 320×320 to 4,000×4,000 dpi, more preferably 400×400 to 1,600×1,600 dpi, and even more preferably 720×720 dpi. Here, the dpi in the present invention represents the number of dots per 2.54 cm.

As described above, regarding the ink composition of the present invention, since it is preferable that the ink composition to be ejected be set to a constant temperature, it is preferable that means for stabilizing the ink composition temperature be provided in the ink jet recording apparatus. The piping system from the ink tank (the intermediary tank in a case where there is an intermediary tank) to the nozzle emission surface and all of the members are sites to be set to a constant temperature. That is, insulation and heating can be performed from the ink supply tank to the ink jet head portion.

The methods of temperature control are not particularly limited; however, for example, it is preferable to provide a plurality of temperature sensors in sites at each pipe, and perform heating control according to the flow amount of the ink composition and the temperature of the environment. The temperature sensors can be provided in the vicinity of the nozzles of the ink supply tank and the ink jet head. In addition, the head unit to be heated is preferably thermally blocked or insulated in order that the apparatus main body is not influenced by the temperature from the outside air. In order to shorten the start-up time of the printer required for heating, or in order to reduce the thermal energy loss, it is preferable to provide insulation from other sites and to decrease the heat capacity of the entire body of the heating unit.

Active ray-curable ink compositions such as the ink composition of the present invention have large changes in viscosity due to temperature changes during ejection since the viscosity is generally higher than aqueous ink compositions which are used in ink compositions for normal ink jet recording. The changes in the viscosity of the ink composition are greatly influenced by changes in the droplet size and changes in the droplet ejection speed, and can lead to deterioration of the image quality. Accordingly, there is a need to keep the temperature of the ink composition at the time of ejection constant as much as possible. Thus, in the present invention, it is suitable that the control band of the temperature of the ink composition be preferably ±5° C. from a set temperature, more preferably ±2° C., and even more preferably ±1° C.

Next, description will be given of step II.

The ink composition which is ejected onto the recording medium is cured by the irradiation of active rays. This is because the radical polymerization initiator included in the ink composition of the present invention is dissolved by the irradiation of the active rays, the polymerization initiating species such as a radical, or the like is generated, and the polymerization reaction of the polymerizable compound is started and promoted by the functions of the initiating species. At this time, if a polymerization initiator and a sensitizer are present in the ink composition, the sensitizer in the system absorbs active rays and enters an excited state, the dissolution of the polymerization initiator is promoted by the contact with the polymerization initiator, and a curing reaction of higher sensitivity can be achieved.

Here, α rays, γ rays, electron beams, X-rays, ultraviolet rays, visible light, infrared light, or the like can be used as the active rays to be used. The peak wavelength of the active rays depend on the absorption characteristics of the sensitizer; however, for example, 200 to 600 nm is preferable, 300 to 450 nm is more preferable, 320 to 420 nm is even more preferable, and active rays which are ultraviolet rays where the peak wavelength is in a range 340 to 400 nm are particularly preferable.

In addition, the polymerization initiation system of the ink composition of the present invention preferably has sufficient sensitivity even with low output active rays. The curing is suitably performed with the exposed surface illuminance in the ink jet recording method of the present invention preferably at 10 to 4,000 $mW/cm^2$, and more preferably at 20 to 2,500 $mW/cm^2$.

As the active ray source, a mercury lamp, a gas or solid-state laser, or the like is mainly used, and, as the light source used in the curing of the ink composition for ultraviolet ray photocurable-type ink jet recording, mercury lamps and metal halide lamps are widely known. However, currently, a move toward becoming mercury free is strongly desirable from the point of view of protecting the environment and replacement with GaN-based semiconductor ultraviolet light-emitting devices is extremely effective, industrially and environmentally. In addition, LED (UV-LED) and LD (UV-LD) are compact, have a long life, high efficiency, and low cost and are anticipated as light sources for photocurable type ink jets.

Further, light emitting diodes (LED) and laser diodes (LD) can be used as active ray sources. In particular, in a case where an ultraviolet source is required, an ultraviolet LED and an ultraviolet LD can be used. For example, Nichia Corporation has launched a violet LED having a wavelength in which the main emission spectrum is between 365 nm and 420 nm. Furthermore, in a case where an even shorter wavelength is necessary, the specification of U.S. Pat. No. 6,084,250A discloses an LED capable of emitting active rays placed in the center between 300 nm and 370 nm. In addition, other ultraviolet LEDs are available and can irradiate radiation of different ultraviolet ray bands. In the present invention, UV-LEDs are particularly preferable active ray sources, and a UV-LED having a peak wavelength in 340 to 400 nm is particularly preferable.

In addition, the maximum illuminance of the LED on the recording medium is preferably 10 to 2,000 $mW/cm^2$, more preferably 20 to 1,000 $mW/cm^2$, and particularly preferably 50 to 800 $mW/cm^2$.

The ink composition of the present invention is suitably irradiated by such active energy rays for preferably 0.01 to 120 seconds and more preferably 0.1 to 90 seconds.

The irradiation conditions of the active energy rays and the basic irradiation method are disclosed in JP1985-132767A (JP-S60-132767A). More specifically, light sources are provided on both sides of the head unit including the ejection apparatus of the ink composition and are operated by scanning the head unit and the light sources using a so-called shuttle system. The irradiation of the active energy rays is performed in a fixed time (preferably 0.01 to 0.5 seconds, more preferably 0.01 to 0.3 seconds, and even more preferably 0.01 to 0.15 seconds) after the landing of the ink composition. By controlling the time from the landing of the ink composition to the irradiation in this manner to be an extremely short time, the ink composition landed on the recording medium can be prevented from blurring before curing. In addition, since exposure can be performed before the ink composition penetrates to a deep portion where the light source does not reach even with respect to a porous recording medium, the residue of the unreacted monomer can be suppressed, which is preferable.

Furthermore, the curing may be completed by another light source unaccompanied by driving. WO99/54415A discloses a method using optical fiber, and a method where a collimated light source is incident on a mirror surface provided on a head unit side surface, and a recorded area is irradiated with UV light and it is possible for these curing methods to be applied to the ink jet recording method of the present invention.

In addition, in the present invention, during the irradiation of the active rays, the atmosphere of the periphery of the surface of the target recording medium is set to a poor oxygen atmosphere (low oxygen atmosphere). It is known that it is possible to reduce the energy of the active rays which is necessary for the curing by suppressing the oxygen concentration in the curing atmosphere; however, in the present invention, it was found to be effective for improving the migration and character blurring, which are important characteristics for printed material for packages.

Generally, the surface of a radical polymer based ink composition which comes into contact with air is easily affected by oxygen polymerization inhibition and, in particular, curing defects are easily generated in the surface. The monomer may remain in the film due to the deterioration of the surface curability or the performance of keeping the low molecular weight component in the film may be insufficient due to forming the cross-linked structure of the film using a multifunctional monomer, whereby the migration is remarkably degraded. However, by performing exposure in an environment with a low oxygen concentration, it is estimated that the extent of the oxygen polymerization inhibition is reduced and the migration is improved.

In addition, since the ink composition of the present invention includes a large amount of component A, the ink composition has a low viscosity and character blurring is easily generated; however, by performing exposure in an environment with a low oxygen concentration, it is estimated that the character blurring in the printed material is improved.

In the present invention, the irradiation of the active rays is performed under a poor oxygen atmosphere where the oxygen partial pressure is 0.10 atmospheres (atm) or less. In detail, this is as follows.

Normally, since the partial pressure of the oxygen under the atmosphere (one atmospheric pressure) is 0.21 atm, in order to reduce the partial pressure of the oxygen to 0.10 atm or less, it is possible to (a) reduce the pressure of the atmosphere to 0.71 or less during the exposure, or (b) blend gases other than oxygen (for example, inert gases such as nitrogen or argon) with air to have 40% by volume or more with respect to the air.

For the poor oxygen atmosphere in the present invention, it is possible to use any method without being particularly limited.

Here, one atm in the present invention is 101,325 Pa.

The oxygen partial pressure is 0.10 atm or less, preferably 0.08 atm or less, more preferably 0.05 atm or less, even more preferably 0.02 atm or less, and particularly preferably 0.005 atm or less.

The lower limit of the oxygen partial pressure is not particularly limited. However, it is possible to set the oxygen partial pressure to virtually zero by substituting the vacuum or the atmosphere with a gas (for example, nitrogen) other than air, which is also a preferable method.

The oxygen concentration according to the inert gas substitution is preferably controlled to be 10% by volume or less (here, at this time, the oxygen partial pressure is controlled to 0.10 atm or less), more preferably controlled to be 0.01 to 2% by volume or less, and even more preferably controlled to be 0.01 to 0.5% by volume or less.

As means for controlling the oxygen concentration of the curing atmosphere to 10% by volume or less, for example, there are methods and the like of setting a nitrogen atmosphere or a carbon dioxide atmosphere with a system where the image forming apparatus is closed. As nitrogen supply means, for example, there are methods of using an apparatus which separates only nitrogen gas from the air using the differences in permeability of nitrogen and oxygen with respect to a hollow fiber membrane using a nitrogen cylinder. There is a supply method using a cylinder as the supply means of the carbon dioxide.

The inert gases refer to common gases such as $N_2$, $H_2$, $CO_2$, and rare gases such as He, Ne, and Ar. Among these, for safety, easy availability, and reasons of cost, $N_2$ is favorably used.

Under reduced pressure indicates a state of 500 hPa (0.05 MPa) or less, and preferably a state of 100 hPa (0.01 MPa) or less.

An ink jet recording apparatus which may be particularly preferably used in the present invention will be described in more detail. The ink-jet recording method of the present invention described above is suitably realized using the ink jet recording apparatus of the present invention as described below.

The ink jet recording apparatus of the present invention has transport means which transports a target recording medium, energy application means which applies active energy to the liquid which is applied onto the target recording medium, means which sets the atmosphere to a poor oxygen atmosphere during the energy application using the energy application means, and control means which controls the transport means and the energy application means while ejecting the liquid from a liquid application portion, where a plurality of line type ejection heads are provided in a length which corresponds to the entire width of the recordable region of the target recording medium, and the ejection heads which eject the recording liquid and the energy application means are preferably arranged in order from the upstream side in the transport direction of the target recording medium.

The ink jet recording apparatus of the present invention is a so-called single pass system ink jet recording apparatus where the ejection heads which eject treatment liquid, ejection heads which eject recording liquid, and the energy application means are preferably arranged in order from the upstream side in the transport direction of the target recording medium, and it is possible to maintain the surface of the treatment liquid ejected as droplets in a liquid form between the application of the treatment liquid and the droplet ejection of the recording liquid using the above arrangement. In addition, by setting a poor oxygen atmosphere during the exposure and curing, it is possible to suppress the polymerization inhibition of the polymerizable compound or the like and accelerate the curing reaction and thus it is possible to improve the rendering of fine portions such as thin lines.

FIG. 1 is a schematic diagram of an ink jet recording apparatus which is preferably used in the present invention. A support 6 which is stretched between support winding rolls 5 and 5' which acts as transport means for the support is transported in the arrow direction and each color of the ink composition (K: black, Y: yellow, M: magenta, C: cyan, and W: white) is ejected from an ink jet head unit 7 where ejection heads which eject ink compositions of each color are arranged.

As shown in FIG. 1, an LED light source unit 1 is surrounded by an inert gas blanket 2 and is connected to an inert gas generating apparatus 4 via an inert gas pipe 3. Since the inert gas generating apparatus 4 which is means for setting the atmosphere in the inert gas blanket 2 to a poor oxygen atmosphere supplies inert gas to an inner portion of the inert gas blanket 2 via an inert gas pipe 3, the atmosphere inside the inert gas blanket 2 is air in an initial state, but the air of the inert gas blanket 2 is substituted with inert gas when the inert gas generating apparatus 4 is operated. As described above, it is possible to use $N_2$ or the like as the inert gas.

As the support, it is preferable to use a support where the film thickness is 10 μm or more and 90 μm or less and which includes at least one material which is selected from a group consisting of polypropylene, polyethylene, polyethylene terephthalate, and nylon. In addition, the support is preferably a resin film, and more preferably a resin film which includes at least one material which is selected from a group consisting of polypropylene, polyethylene, polyethylene terephthalate, and nylon.

Here, the above-described "resin film which contains at least one material" means having at least one layer formed of a material which is selected from a group consisting of polyethylene terephthalate, polyethylene, polypropylene, and nylon in a case where the resin film is a laminated film which has a multilayer structure. Here, the film may have two or more layers formed of components which are selected from a group consisting of polyethylene terephthalate, polyethylene, polypropylene, and nylon as in a laminated film of polypropylene and polyethylene.

As polyethylene, LDPE (low density polyethylene), MDPE (medium density polyethylene), and HDPE (high density polyethylene) are preferably used, as polypropylene, CPP (cast polypropylene), OPP (biaxially oriented polypropylene), KOP (polyvinylidene chloride coated OPP), and AOP (PVA coat OPP) are preferably used, as the PET, biaxially oriented polyester is preferably used, and as nylon, ON (oriented nylon), KON (oriented nylon), and CN (cast nylon) are preferably used.

Other than the above, the combined use of EVA (ethylene-vinyl acetate copolymer film), PVA (vinylon), EVOH (polyvinyl alcohol), PVC (polyvinyl chloride), PVDC (polyvinylidene chloride, Saran), cellophane (PT, MST, K cello), ZX (Zekuron (polyacrylonitrile, PAN)), and PS (polystyrene, styrol) is also preferable.

The optimal material is selected depending on the use of the package and, in addition, it is possible to manufacture a film where the characteristics of each of the materials are combined by setting a film which has a multilayer structure.

In addition, with the object of improving the strength of the package, blocking oxygen, and the like, it is possible to incorporate AL (aluminum foil), VM film (aluminum vapor deposition film or transparent vapor deposition film) or the like in the multilayer structure.

In the printing method of the present invention, an upper portion of the printed material is preferably laminate processed after ink jet printing is performed on the above-described support.

By the laminate processing, it is possible to suppress the elution of the ink components from the printed material, blocking, and odor, and it is possible to preferably use the printed material as a food package in particular.

In addition, in recent years, a coextruded film where lamination is performed at the same time as resins are extruded together from two or more parallel slits and formed into a film is preferably used. Since lamination is possible up to a maximum of 5 to 7 layers even for thin layers of several μm which cannot take the shape of a film, films with a variety of performances and applications have been made.

The printing method of the present invention preferably uses a support with a film thickness of 10 to 90 μm, and more preferably uses a support with a film thickness of 20 to 80 μm.

By adopting the ink jet recording method as described above, even with respect to various recording media for which the wettability of the surfaces are different, the dot diameter of the landed ink composition can be kept constant and the image quality can be improved. In addition, in order to obtain a color image, it is preferable that colors be superimposed in order of low brightness. By superimposing the colors in order of ink compositions with low brightness, the radiation rays reach the ink composition of the lower part more easily, and favorable curing sensitivity, a reduction in the monomer residue, and an improvement in the adhesion can be expected. Further, with the irradiation, all the colors can be ejected and exposed together; however, exposing one color at a time is preferable from the point of view of curing promotion.

In this manner, by curing the ink composition of the present invention with high sensitivity using the irradiation of active energy rays, an image can be formed on the recording medium surface.

The ink composition of the present invention is preferably used as an ink set formed of a plurality of inks for ink jet recording.

In the ink jet recording method of the present invention, the order of each of the colored ink compositions to be ejected is not particularly limited; however, it is preferable to start application to the recording medium from the colored ink compositions with high brightness, and in a case of using yellow, cyan, magenta, and black, it is preferable to perform the application onto the recording medium in the order of yellow, cyan, magenta, black. In addition, in a case where white is added to the above, it is preferable to perform the application onto the recording medium in the order of white, yellow, cyan, magenta, black. Furthermore, the present invention is not limited thereto and it is possible to preferably use the ink set of the present invention where at least a total of 7 colors are included with yellow, light cyan, cyan, magenta, black, and white ink compositions and in such a case, it is preferable to perform the application onto the recording medium in the order of white, light cyan, light magenta, yellow, cyan, magenta, black.

EXAMPLES

Examples and Comparative Examples are shown below, whereby the present invention will be more specifically described. However, the present invention is not limited by these Examples.

Here, the "parts" in the following description indicate "parts by mass" unless otherwise noted.

The materials which were used in the present invention are as shown below.

<Coloring Agent>

IRGALITTE BLUE GLVO (cyan pigment, manufactured by BASF Japan Co., Ltd.)

CINQUASIA MAGENTA RT-355-D (magenta pigment, manufactured by BASF Japan Co., Ltd.)

NOVOPERM YELLOW H2G (yellow pigment, manufactured by Clariant Co., Ltd.)

SPECIAL BLACK 250 (black pigment, manufactured by BASF Japan Co., Ltd.)

Tipaque CR60-2 (white pigment, manufactured by Ishihara Sangyo Kaisha, Ltd.)

<Dispersing Agent>

SOLSPERSE32000 (dispersing agent manufactured by Noveon Inc.)

SOLSPERSE36000 (dispersing agent manufactured by Noveon Inc.)

<Polymerizable Compounds (Monomers)>

SR341 (3-methyl pentanediol diacrylate, manufactured by Sartomer Co., Ltd.)

SR9003 (PO-modified neopentyl glycol diacrylate, manufactured by Sartomer Co., Ltd.)

CD595 (1,10-decanediol diacrylate, manufactured by Sartomer Co., Ltd.)

CD262 (1,12-dodecanediol diacrylate, manufactured by Sartomer Co., Ltd.)

CD561 (EO-modified hexanediol diacrylate, manufactured by Sartomer Co., Ltd., average EO addition molar number: 4 to 6, molecular weight: 400 to 490)

CD580 (EO-modified cyclohexanedimethanol diacrylate, manufactured by Sartomer Co., Ltd., EO addition molar number: 2 to 4, molecular weight: 336 to 416)

SR454 (EO-modified trimethylolpropane triacrylate, manufactured by Sartomer Co., Ltd., EO addition molar number: 3, molecular weight: 414)

SR295 (pentaerythritol tetra acrylate, manufactured by Sartomer Co., Ltd., EO addition molar number: none, molecular weight: 350)

CD501 (propoxylated trimethylolpropane triacrylate, manufactured by Sartomer Co., Ltd., PO addition molar number: 3, molecular weight: 468)

VEEA (acryloyloxyethyl vinyl ether, manufactured by Nippon Shokubai Co., Ltd.)

SR339 (phenoxy ethyl acrylate, manufactured by Sartomer Co., Ltd.)

SR238 (hexanediol diacrylate, manufactured by Sartomer Co., Ltd.)

<Polymerization Initiator>

IRGACURE 819 (bis(2,4,6-trimethyl benzoyl)phenyl phosphine oxide, molecular weight: 418.46, manufactured by BASF Japan Co., Ltd.)

SPEEDCURE 7010 (the compound I-B, molecular weight 1899, manufactured by Lambson Co., Ltd.)

SPEEDCURE ITX (isopropylthioxanthone, molecular weight 212, manufactured by Lambson Co., Ltd.)

IRGACURE 127 (bis($\alpha$-hydroxy ketone) compound, molecular weight 340, manufactured by BASF Japan Co., Ltd.)

<Polymerization Inhibitor>

FIRSTCURE ST-1 (polymerization inhibitor, mixture of tris(N-nitroso-N-phenylhydroxyamine) aluminum salt (10 mass %) and phenoxy ethyl acrylate (90 mass %), manufactured by Chem First Co., Ltd.)

<Surfactant>

BYK307 (silicone-based surfactant, manufactured by BYK Chemie Co., Ltd.)

(Preparation of Each Mill Base)

300 parts by mass of IRGALITTE BLUE GLVO, 620 parts by mass of SR9003, and 80 parts by mass of SOLSPERSE32000 were mixed by stirring and a cyan mill base A was obtained. Here, the preparation of the cyan mill base A is placed into a disperser motor mill M50 (manufactured by Eiger Corp.) and dispersion was performed for 4 hours at a rotation speed of 9 m/s using zirconia beads with a diameter of 0.65 mm.

In the same manner as cyan mill base A, a magenta mill base B, a yellow mill base C, a black mill base D, and a white mill base E were prepared with the compositions and dispersion conditions shown in Table 1.

TABLE 1

| | Mill Base | Cyan Mill Base A | Magenta Mill Base B | Yellow Mill Base C | Black Mill Base D | White Mill Base E |
|---|---|---|---|---|---|---|
| Composition (parts) | IRGALITE BLUE GLVO | 300 | — | — | — | — |
| | CINQUASIA MAGENTA RT-355-D | — | 300 | — | — | — |
| | NOVOPERM YELLOW H2G | — | — | 300 | — | — |
| | SPECIAL BLACK 250 | — | — | — | 400 | — |
| | TIPAQUE CR60-2 | — | — | — | — | 500 |
| | SR9003 | 620 | 600 | 600 | 520 | 440 |
| | SOLSPERSE 32000 | 80 | 100 | 100 | 80 | 60 |
| Dispersion Conditions | Rotation Speed (m/s) | 9 | 9 | 9 | 9 | 9 |
| | Time (hours) | 4 | 10 | 10 | 7 | 4 |

Examples 1 to 27 and Comparative Examples 1 to 9

<Method of Manufacturing Ink Composition>

Each of the ink compositions was obtained by mixing and stirring the component which are described in Table 2 to Table 5. Here, "-" in the table has the meaning that the component is not added.

<Ink Jet Recording Method>

In the ink jet apparatus which is shown in FIG. 1, as the ink jet heads, 4 of CA3 heads manufactured by Toshiba Tec Corp. were arranged in parallel for each of the colors, the heads were heated to 45° C., and the frequency was controlled to be able to render an image with a droplet size of 42 pL. An LED light source unit (LEDZero Solidcure, manufactured by Integration Technology Inc.) with a peak wavelength of 385 nm was arranged inside the inert gas blanket as a light source, the illuminance was condensed to 3,200 mW/cm$^2$, an $N_2$ gas generating apparatus Maxi-Flow30 with compressor (manufactured by Inhouse Gas Co., Ltd.) was connected at a pressure of 0.2 mPa·s as the inert gas source, $N_2$ was made to flow with a flow amount of 2 to 10 L/min such that the oxygen partial pressure inside the blanket became the predetermined ranges which are described in Table 2 to Table 5, and the oxygen partial pressure (the oxygen concentration) was set. A Pylen film-OTP3162 (A4 size, polypropylene sheet, 40 μm) as the support was manipulated at a speed of 50 m/min, a 100% solid image was rendered, and the various performance tests which are shown below were performed.

<Migration Evaluation>

10 mL of a mixed liquid where water:ethanol=70:30 was added dropwise onto a printed material surface with a printing area of 1.0 dm$^2$, the entire printed material was placed into a glass closed container so as not to volatize the mixed liquid and left to stand for 10 days at 40° C. Thereafter, the total elution amount (overall migration volume: OML) from the film which was contained in the water-ethanol mixture was measured and evaluated in 1 to 5 stages. Here, the measurement of the total elution amount was performed by volatizing the water-ethanol mixture after extraction and measuring the mass of the remaining components.

5: Elution amount of less than 1.0 ppm/dm$^2$.
4: Elution amount of 1.0 ppm/dm$^2$ or more and less than 4.0 ppm/dm$^2$.
3: Elution amount of 4.0 ppm/dm$^2$ or more and less than 10.0 ppm/dm$^2$.
2: Elution amount of 10.0 ppm/dm$^2$ or more and less than 100 ppm/dm$^2$.
1: Elution amount of 100 ppm/dm$^2$ or more.

<Odor Evaluation>

The image which was obtained by the above-described ink jet image recording method was wrapped in a 30 cm×30 cm vinyl bag with a zip and left to stand for 24 hours under an atmosphere of 60° C. Thereafter, the zip was undone and the odor was evaluated. The evaluation was taken from the average of 10 people.
5: Almost odorless.
4: A slight odor, but hardly noticeable.
3: A certain amount of odor, but not an uncomfortable level.
2: A strong odor.
1: A very strong odor.

<Blocking Resistance Evaluation>

In the above-described ink jet recording method, after a total of 5 sheets of printed material were created, the obtained images were stacked, a 5 kg weight was placed on top, and then left to stand for 24 hours in an oven at 30° C., the degree of sticking between images was evaluated.

5: The printed materials did not stick together at all.
4: The printed materials did stick together but were easily pulled apart by hand and there was no transfer of the image to rear surface of the upper support.
3: The printed materials did stick together and when pulled apart by hand without care, there was transfer of the image to rear surface of the upper support (less than 10% of the entire image was transferred).
2: The printed materials did stick together and when pulled apart by hand without care, there was transfer of the image to rear surface of the upper support (10% or more of the entire image was transferred).
1: The printed materials did stick together and were difficult to pull apart by hand.

<Curing Evaluation>

A swab was immersed in isopropyl alcohol (IPA) and the printed material surface was rubbed with the swab, and the number of times until the support was exposed was determined.
5: 50 times or more
4: 30 times or more and less than 50 times
3: 10 times or more and less than 30 times
2: More than 5 times and less than 10 times
1: 5 times or less <Character Blurring Evaluation>

In the above-described printing method, instead of a 100% solid image, the 6 pt character "鷹" (the Japanese kanji) was printed and the sharpness of the character was visually evaluated.
5: There was no blurring and it was possible to clearly recognize the character.
4: Slight blurring was observed; however, it was possible to independently recognize all the lines.
3: Blurring was observed and some of the lines were connected and some space was lost; however, it was possible to recognize the 1, character.
2: The blurring was severe, many lines were connected, and a lot of space was lost.
1: The blurring was extremely severe, almost all the lines were connected, and the space was lost.

<Continuous Discharge Stability Evaluation>

Using a jig where a CA4 (manufactured by Toshiba Tec Corp., 318 nozzles) is set up, continuous ejection stability evaluation was performed at 6 kHz. The temperature of the head was controlled such that the ejection viscosity became 8 to 9 mPa·s. Continuous ejection was performed for 30 minutes and evaluation of the number of nozzles where ejection was not possible (the nozzle loss number) was performed.
5: The nozzle loss number was 0 or 1
4: The nozzle loss number was 2 or 3
3: The nozzle loss number was 4 or 5
2: The nozzle loss number was 5 to 10
1: The nozzle loss number was 11 or more The evaluation results of each of the ink compositions of Examples 1 to 27 and Comparative Examples 1 to 9 are shown in Table 2 to Table 5.

TABLE 2

| | | Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Component A | 3-methyl pentanediol diacrylate | 72.8 | 69.8 | 73.8 | 72.8 | 59.8 | 30.0 | 30.0 | 30.0 | 40.0 | 50.0 | 60.0 |
| Component B | EO-modified trimethylolpropane triacrylate | 13.0 | 8.0 | 8.0 | 13.0 | 4.0 | 4.0 | 4.0 | 4.0 | 4.0 | 4.0 | 8.0 |

TABLE 2-continued

| | | Examples | | | | | | | | | | |
|---|---|---|---|---|---|---|---|---|---|---|---|
| | | 1 | 2 | 3 | 4 | 5 | 6 | 7 | 8 | 9 | 10 | 11 |
| Other polymerizable compounds | 1,10-decanediol diacrylate | — | — | — | — | — | 51.8 | — | — | 41.8 | 31.8 | 17.8 |
| | PO-modified neopentyl glycol diacrylate | — | — | — | — | — | — | 51.8 | — | — | — | — |
| | VEEA (acryloyloxyethyl vinyl ether) | — | — | — | — | — | — | — | — | — | — | — |
| | Phenoxy ethyl acrylate | — | — | — | — | — | — | — | 51.8 | — | — | — |
| Polymerization initiators | IRGACURE 819 | 4.0 | 4.0 | 4.0 | 4.0 | 4.0 | 4.0 | 4.0 | 4.0 | 4.0 | 4.0 | 4.0 |
| | SPEEDCURE 7010 | 2.0 | 2.0 | 2.0 | 2.0 | 2.0 | 2.0 | 2.0 | 2.0 | 2.0 | 2.0 | 2.0 |
| Mill Bases | Cyan mill base | 8.0 | — | — | — | — | 8.0 | 8.0 | 8.0 | 8.0 | 8.0 | 8.0 |
| | Magenta mill base | — | 16.0 | — | — | — | — | — | — | — | — | — |
| | Yellow mill base | — | — | 12.0 | — | — | — | — | — | — | — | — |
| | Black mill base | — | — | — | 8.0 | — | — | — | — | — | — | — |
| | White mill base | — | — | — | — | 30.0 | — | — | — | — | — | — |
| Polymerization Inhibitor | FIRSTCURE ST-1 | 0.1 | 0.1 | 0.1 | 0.1 | 0.1 | 0.1 | 0.1 | 0.1 | 0.1 | 0.1 | 0.1 |
| Surfactant | BYK307 | 0.1 | 0.1 | 0.1 | 0.1 | 0.1 | 0.1 | 0.1 | 0.1 | 0.1 | 0.1 | 0.1 |
| | Total (mass %) | 100.0 | 100.0 | 100.0 | 100.0 | 100.0 | 100.0 | 100.0 | 100.0 | 100.0 | 100.0 | 100.0 |
| | Oxygen concentration during active ray irradiation (volume %) | 0.2 | 0.2 | 0.2 | 0.2 | 0.2 | 0.2 | 0.2 | 0.2 | 0.2 | 0.2 | 0.2 |
| | Oxygen partial pressure during active ray irradiation (atm) | 0.002 | 0.002 | 0.002 | 0.002 | 0.002 | 0.002 | 0.002 | 0.002 | 0.002 | 0.002 | 0.002 |
| | Viscosity of ink composition at 25° C. [mPa·s] | 10.9 | 11.5 | 11.3 | 10.9 | 12.9 | 11.8 | 16.8 | 14.5 | 11.5 | 11.4 | 11.4 |
| Evaluation Results | Migration | 4 | 4 | 4 | 4 | 4 | 3 | 3 | 3 | 4 | 4 | 4 |
| | Odor | 5 | 5 | 5 | 5 | 5 | 4 | 3 | 3 | 4 | 4 | 4 |
| | Blocking resistance | 5 | 5 | 5 | 5 | 4 | 5 | 5 | 3 | 5 | 4 | 4 |
| | Curability | 5 | 5 | 5 | 5 | 5 | 5 | 5 | 3 | 5 | 5 | 5 |
| | Character blurring | 5 | 5 | 5 | 5 | 5 | 3 | 5 | 5 | 5 | 4 | 5 |
| | Continuous ejection stability | 5 | 5 | 5 | 5 | 5 | 5 | 4 | 4 | 5 | 5 | 5 |

TABLE 3

| | | Examples | | | | | | | | | | |
|---|---|---|---|---|---|---|---|---|---|---|---|
| | | 12 | 13 | 14 | 15 | 16 | 17 | 18 | 19 | 20 | 21 | 22 |
| Component A | 3-methyl pentanediol diacrylate | 80.0 | 89.8 | 72.8 | 72.8 | 72.8 | 72.8 | 45.8 | 72.8 | 72.8 | 72.8 | 72.8 |
| Component B | EO-modified trimethylolpropane triacrylate | 5.8 | — | — | — | — | — | — | 17.0 | 13.5 | 13.1 | 13.1 |
| | EO-modified cyclohexanedimethanol diacrylate | — | — | 13.0 | — | — | — | — | — | — | — | — |
| | EO-modified hexanediol diacrylate | — | — | — | 13.0 | — | — | — | — | — | — | — |
| | Pentaerythritol tetra acrylate | — | — | — | — | 13.0 | — | — | — | — | — | — |
| | Propoxylated trimethylolpropane triacrylate | — | — | — | — | — | 13.0 | — | — | — | — | — |
| Other polymerizable compound | 1,10-decanediol diacrylate | — | — | — | — | — | — | 40.0 | — | — | — | — |
| Polymerization initiators | IRGACURE 819 | 4.0 | 2.0 | 4.0 | 4.0 | 4.0 | 4.0 | 4.0 | 2.0 | — | 4.0 | 4.0 |
| | IRGACURE 127 | — | — | — | — | — | — | — | — | 5.0 | — | — |
| | SPEEDCURE 7010 | 2.0 | — | 2.0 | 2.0 | 2.0 | 2.0 | 2.0 | — | — | 2.0 | 2.0 |
| | SPEEDCURE ITX | — | — | — | — | — | — | — | — | 0.5 | — | — |
| Mill base | Cyan mill base | 8.0 | 8.0 | 8.0 | 8.0 | 8.0 | 8.0 | 8.0 | 8.0 | 8.0 | 8.0 | 8.0 |
| Polymerization Inhibitor | FIRSTCURE ST-1 | 0.1 | 0.1 | 0.1 | 0.1 | 0.1 | 0.1 | 0.1 | 0.1 | 0.1 | 0.1 | — |
| Surfactant | BYK307 | 0.1 | 0.1 | 0.1 | 0.1 | 0.1 | 0.1 | 0.1 | 0.1 | 0.1 | — | 0.1 |
| | Total (mass %) | 100.0 | 100.0 | 100.0 | 100.0 | 100.0 | 100.0 | 100.0 | 100.0 | 100.0 | 100.0 | 100.0 |
| | Oxygen concentration during active ray irradiation (volume %) | 0.2 | 0.2 | 0.2 | 0.2 | 0.2 | 0.2 | 0.2 | 0.2 | 0.2 | 0.2 | 0.2 |
| | Oxygen partial pressure during active ray irradiation (atm) | 0.002 | 0.002 | 0.002 | 0.002 | 0.002 | 0.002 | 0.002 | 0.002 | 0.002 | 0.002 | 0.002 |
| | Viscosity of ink composition at 25° C. [mPa·s] | 9.8 | 8.0 | 12.4 | 10.8 | 11.1 | 11.0 | 11.0 | 10.5 | 13.1 | 10.9 | 10.9 |

TABLE 3-continued

| | | Examples | | | | | | | | | | |
|---|---|---|---|---|---|---|---|---|---|---|---|---|
| | | 12 | 13 | 14 | 15 | 16 | 17 | 18 | 19 | 20 | 21 | 22 |
| Evaluation Results | Migration | 4 | 4 | 4 | 4 | 3 | 4 | 4 | 4 | 3 | 4 | 4 |
| | Odor | 5 | 4 | 5 | 5 | 4 | 5 | 5 | 5 | 3 | 5 | 5 |
| | Blocking resistance | 3 | 4 | 5 | 5 | 3 | 5 | 5 | 5 | 4 | 5 | 5 |
| | Curability | 4 | 4 | 5 | 5 | 3 | 5 | 5 | 5 | 5 | 5 | 5 |
| | Character blurring | 5 | 5 | 5 | 5 | 3 | 5 | 5 | 5 | 5 | 5 | 5 |
| | Continuous ejection stability | 5 | 5 | 5 | 5 | 5 | 5 | 5 | 5 | 4 | 5 | 5 |

TABLE 4

| | | Examples | | | | | |
|---|---|---|---|---|---|---|---|
| | | 1 | 23 | 24 | 25 | 26 | 27 |
| Component A | 3-methyl pentanediol diacrylate | | | 72.8 | | | |
| Component B | EO-modified hexanediol diacrylate | | | 13.0 | | | |
| Polymerization initiators | IRGACURE 819 | | | 4.0 | | | |
| | SPEEDCURE 7010 | | | 2.0 | | | |
| Mill base | Cyan mill base | | | 8.0 | | | |
| Polymerization Inhibitor | FIRSTCURE ST-1 | | | 0.1 | | | |
| Surfactant | BYK307 | | | 0.1 | | | |
| Total (mass %) | | | | 100.0 | | | |
| Oxygen concentration during active ray irradiation (volume %) | | 0.2 | 0.5 | 1.0 | 2.0 | 5.0 | 10.0 |
| Oxygen partial pressure during active ray irradiation (atm) | | 0.002 | 0.005 | 0.010 | 0.020 | 0.050 | 0.100 |
| Evaluation Results | Migration | 4 | 4 | 4 | 4 | 3 | 3 |
| | Odor | 5 | 5 | 5 | 4 | 4 | 3 |
| | Blocking resistance | 5 | 5 | 5 | 5 | 4 | 3 |
| | Curability | 5 | 5 | 5 | 5 | 4 | 3 |
| | Character blurring | 5 | 5 | 5 | 5 | 4 | 3 |
| | Continuous ejection stability | 5 | 5 | 5 | 5 | 5 | 5 |

TABLE 5

| | | Comparative Examples | | | | | | | | |
|---|---|---|---|---|---|---|---|---|---|---|
| | | 1 | 2 | 3 | 4 | 5 | 6 | 7 | 8 | 9 |
| Component A | 3-methyl pentanediol diacrylate | — | — | — | — | 10.0 | 20.0 | — | 72.8 | 72.8 |
| Component B | EO-modified hexanediol diacrylate | 25.8 | 25.8 | 25.8 | 25.8 | 25.8 | 25.8 | 13.0 | 13.0 | 13.0 |
| Other polymerizable compounds | hexanediol diacrylate | — | — | — | — | — | — | 72.8 | — | — |
| | 1,12-dodecanediol diacrylate | — | — | — | 60.0 | — | — | — | — | — |
| | PO-modified neopentyl glycol diacrylate | — | — | 60.0 | — | — | — | — | — | — |
| | VEEA (acryloyloxyethyl vinyl ether) | — | 60.0 | — | — | — | — | — | — | — |
| | Phenoxy ethyl acrylate | 60.0 | — | — | — | 50.0 | 40.0 | — | — | — |
| Polymerization initiator | IRGACURE 819 | 4.0 | 4.0 | 4.0 | 4.0 | 4.0 | 4.0 | 4.0 | 4.0 | 4.0 |
| | SPEEDCURE 7010 | 2.0 | 2.0 | 2.0 | 2.0 | 2.0 | 2.0 | 2.0 | 2.0 | 2.0 |
| Mill base | Cyan mill base | 8.0 | 8.0 | 8.0 | 8.0 | 8.0 | 8.0 | 8.0 | 8.0 | 8.0 |
| Polymerization inhibitor | FIRSTCURE ST-1 | 0.1 | 0.1 | 0.1 | 0.1 | 0.1 | 0.1 | 0.1 | 0.1 | 0.1 |
| Surfactant | BYK307 | 0.1 | 0.1 | 0.1 | 0.1 | 0.1 | 0.1 | 0.1 | 0.1 | 0.1 |
| Total (mass %) | | 100.0 | 100.0 | 100.0 | 100.0 | 100.0 | 100.0 | 100.0 | 100.0 | 100.0 |
| Oxygen concentration during active ray irradiation (volume %) | | 0.2 | 0.2 | 0.2 | 0.2 | 0.2 | 0.2 | 0.2 | 15.0 | 21.0 |
| Oxygen partial pressure during active ray irradiation (atm) | | 0.002 | 0.002 | 0.002 | 0.002 | 0.002 | 0.002 | 0.002 | 0.15 | 0.21 |
| Viscosity of ink composition at 25° C. [mPa · s] | | 17.4 | 13.1 | 24.1 | 19.4 | 17.5 | 16.4 | 11.9 | 10.9 | 10.9 |
| Evaluation Results | Migration | 1 | 3 | 2 | 1 | 1 | 2 | 4 | 3 | 2 |
| | Odor | 1 | 1 | 2 | 3 | 1 | 2 | 2 | 1 | 1 |
| | Blocking resistance | 2 | 5 | 5 | 5 | 2 | 5 | 5 | 3 | 2 |
| | Curability | 4 | 5 | 5 | 2 | 4 | 4 | 5 | 2 | 2 |
| | Character blurring | 4 | 5 | 5 | 5 | 4 | 4 | 5 | 2 | 1 |
| | Continuous ejection stability | 5 | 2 | 3 | 4 | 4 | 4 | 5 | 5 | 5 |

What is claimed is:

1. An ink jet recording method comprising:
   ejecting an ink composition which contains 3-methyl pentanediol diacrylate of 30 mass % or more with respect to the total ink composition from an ink jet head onto a support; and
   irradiating active rays in an atmosphere where the oxygen partial pressure is 0.10 atm or less to cure the ink composition.

2. The ink jet recording method according to claim 1, wherein the ink composition contains 3-methyl pentanediol diacrylate of 40 mass % or more with respect to the total ink composition.

3. The ink jet recording method according to claim 1, wherein the ink composition contains 3-methyl pentanediol diacrylate of 50 mass % or more with respect to the total ink composition.

4. The ink jet recording method according to claim 1, wherein the ink composition contains a multifunctional acrylate compound with a molecular weight of 315 or more of 5 to 40 mass % with respect to the total ink composition.

5. The ink jet recording method according to claim 1, wherein the ink composition contains a bisacylphosphine compound.

6. The ink jet recording method according to claim 1, wherein the ink composition substantially does not contain a polymerization initiator with a molecular weight of 354 or less.

7. The ink jet recording method according to claim 1, wherein the ink composition contains a compound represented by the following Formula (1) or Formula (2),

[Chem. 1]

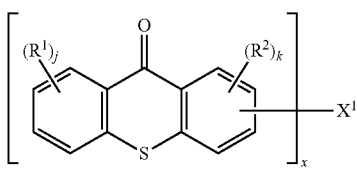

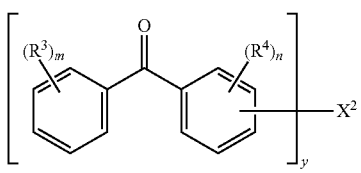

in Formula (1) and Formula (2), $R^1$, $R^2$, $R^3$, and $R^4$ each independently represent an alkyl group which has a carbon number of 1 to 5 or a halogen atom, x and y each independently represent an integer of 2 to 4, m and j each independently represent an integer of 0 to 4, k and n each independently represent an integer of 0 to 3, when j, k, m, and n are integers of 2 or more, $R^1$, $R^2$, $R^3$, and $R^4$, which are present as a plurality, may respectively be the same or different, $X^1$ may include an ether bond and/or an ester bond, and represent a hydrocarbon chain with x valence which has a carbon number of 2 to 300, $X^2$ may include an ether bond and/or an ester bond, and represent a hydrocarbon chain with y valence which has a carbon number of 2 to 300.

8. The ink jet recording method according to claim 5, wherein the ink composition contains a compound represented by the following Formula (1) or Formula (2),

[Chem. 1]

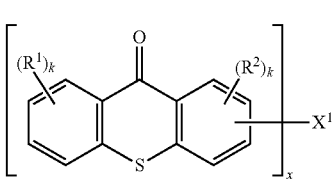

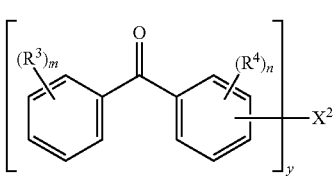

in Formula (1) and Formula (2), $R^1$, $R^2$, $R^3$, and $R^4$ each independently represent an alkyl group which has a carbon number of 1 to 5 or a halogen atom, x and y each independently represent an integer of 2 to 4, m and j each independently represent an integer of 0 to 4, k and n each independently represent an integer of 0 to 3, when j, k, m, and n are integers of 2 or more, $R^1$, $R^2$, $R^3$, and $R^4$, which are present as a plurality, may respectively be the same or different, $X^1$ may include an ether bond and/or an ester bond, and represent a hydrocarbon chain with x valence which has a carbon number of 2 to 300, $X^2$ may include an ether bond and/or an ester bond, and represent a hydrocarbon chain with y valence which has a carbon number of 2 to 300.

9. The ink jet recording method according to claim 1, wherein a viscosity of the ink composition at 25° C. is 8 to 13 mPa·s.

10. The ink jet recording method according to claim 1, wherein the ink composition contains 3-methyl pentanediol diacrylate of 95 mass % or less with respect to the total ink composition.

11. The ink jet recording method according to claim 1, wherein the ejecting of the ink composition is performed by a single pass system.

12. The ink jet recording method according to claim 11, wherein a transport speed of the support is 50 m/min or more.

13. The ink jet recording method according to claim 1, wherein the support includes a material which is selected from a group consisting of polypropylene, polyethylene, polyethylene terephthalate, and nylon, and is a support with a film thickness of 10 to 90 μm.

14. The ink jet recording method according to claim 1, wherein the active rays are irradiated in an atmosphere where the oxygen partial pressure is 0.02 atmospheres or less.

15. The ink jet recording method according to claim 1, wherein a content of a monofunctional polymerizable compound is 5 mass % or less with respect to the total ink composition.

16. The ink jet recording method according to claim 1, wherein the ink jet recording method is used for package printing.

17. A printed material which is obtained by the ink jet recording method according to claim 1.

* * * * *